(12) United States Patent
Fuh et al.

(10) Patent No.: US 7,650,352 B2
(45) Date of Patent: Jan. 19, 2010

(54) SYSTEM AND METHOD FOR INCREASING AVAILABILITY OF AN INDEX

(75) Inventors: You-Chin Fuh, San Jose, CA (US); Sauraj Goswami, Palo Alto, CA (US); Jeffrey William Josten, San Jose, CA (US); James Zu-Chia Teng, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 238 days.

(21) Appl. No.: 11/277,355

(22) Filed: Mar. 23, 2006

(65) Prior Publication Data

US 2007/0226235 A1    Sep. 27, 2007

(51) Int. Cl.
*G06F 7/00* (2006.01)
*G06F 17/30* (2006.01)

(52) U.S. Cl. .................. 707/101; 707/202; 707/203; 707/204; 714/15

(58) Field of Classification Search .................. None
See application file for complete search history.

(56) References Cited

U.S. PATENT DOCUMENTS

| | | | | |
|---|---|---|---|---|
| 4,945,474 | A | * | 7/1990 | Elliott et al. .................. 714/16 |
| 5,123,104 | A | * | 6/1992 | Levine et al. .................. 707/1 |
| 5,758,356 | A | * | 5/1998 | Hara et al. .................. 707/202 |
| 5,822,749 | A | * | 10/1998 | Agarwal .................. 707/2 |
| 5,920,854 | A | * | 7/1999 | Kirsch et al. .................. 707/3 |
| RE36,846 | E | | 8/2000 | Ng et al. |
| 6,578,026 | B1 | * | 6/2003 | Cranston et al. .................. 707/2 |
| 6,591,269 | B1 | * | 7/2003 | Ponnekanti .................. 707/100 |

FOREIGN PATENT DOCUMENTS

JP   20040623376 A2   7/2002

OTHER PUBLICATIONS

Fe Levine, "Rollback Index Recovery for Algorithm for Recovery and Isolation Exploiting Semantics for Index Management", IBM Technical Disclosure Bulletin, v39, n3, 1996 p. 149-152.

(Continued)

*Primary Examiner*—Jean M Corrielus
*Assistant Examiner*—Loan T Nguyen
(74) *Attorney, Agent, or Firm*—Gates & Cooper LLP

(57) ABSTRACT

A partial index availability system places, in a restricted state, all pages in the index associated with a structure modification, when an error occurs in processing a log of the said structure modification. This maintains traversability of the rest of the index that is not in restricted state. The system locates and marks a left sentinel and a right sentinel associated with a non-leaf page that is in a restricted state preventing an undo of a transaction. The sentinels prevent a transaction from accessing an uncommitted change associated with the non-leaf page. After a recovery procedure is run the entire index is made available. During the period between the placement of the index pages in LPL or rebuild pending to the time of final removal of these pages from their restrictive states as a result of a recovery procedure being run, the users are given access to the non-restricted portion of the index.

19 Claims, 13 Drawing Sheets

OTHER PUBLICATIONS

DP Lyle Lockwood, et al., "Index Recovery Method for Transactions Performing Load Operations", IBM Technical Disclosure Bulletin, v38, n6, 2005, pp. 409-410.

"Counter-intuitive RAID Rebuild Algorithm for Virtual Tape Server," RD n450 10-2001 Article 138 p. 1779, 2001.

GR horn Bullock, et al., "Recovery of Data Pages After Partial Page Writes," IBM Technical Disclosure Bulletin, Aug. 1991, pp. 69-83.

* cited by examiner

SYSTEM AND METHOD FOR INCREASING AVAILABILITY OF AN INDEX

FIELD OF THE INVENTION

The present invention generally relates to an index and in particular to an index in database systems. More specifically, the present invention relates to a page-based method of index management that partially masks errors in the index by placing only portions of the index in restricted state, allowing normal operations to continue for the rest of the index.

BACKGROUND OF THE INVENTION

A common problem in managing indexes in database systems is that any transient physical error in failing to read or write to an index page results in placing the whole index in a restrictive state until some kind of recovery procedure is run. There are generally two kinds of restricted states. The first kind of restricted states is where index pages are placed in the restricted state (also referred to herein as logical page list or LPL) due to a physical error.

The second kind of restricted states is where index pages are placed in the restrictive state (referred to as rebuild pending) due to a logical error, such as a software bug that usually manifests itself as a mismatch between the data on the log record and the data on the index page.

The index is placed in restrictive state due to a physical error during redo, a physical error during undo, a logical error during redo, or a logical error during undo. Physical errors during redo or undo occur when logs cannot be applied. Consequently, recovery from the restrictive state comprises reapplying logs.

Since a physical error prevents a log apply to the index, the index manager places the affected pages of the index in restricted state after the buffer manager attempts a retry process to correct for the error. A log record cannot be skipped; therefore, there is no alternative to placing the page in restrictive state. In essence, restrictive state recovery is then a retry process of reapplying the logs.

The pages in the restrictive state are not accessible for normal index operations. Thus taking the entire index offline causes outages of the database since users have no access to the index till the index is repaired. Index recovery from either LPL or from rebuild pending state requires running expensive utilities, which adds to the time the index is offline.

What is needed to provide access to the index in the presence of physical errors and software bugs is a method of placing a portion of the index into restricted access. There currently exists no method for placing a portion of the index into restricted access while maintaining logical consistency of the remainder of the index and preventing users from seeing uncommitted changes in the index.

What is therefore needed is a system, a computer program product, and an associated method for increasing availability of an index. The need for such a solution has heretofore remained unsatisfied. In conventional systems, any logical error would result in keeping the entire index in rebuild pending restrictive state and then later rebuilding the entire index. Rebuilding the entire index could be quite expensive in terms of resources. What is also needed is an improvement that allows a partial rebuild of the index to recover from rebuild pending state.

SUMMARY OF THE INVENTION

The present invention satisfies this need, and presents a system, a service, a computer program product, and an associated method (collectively referred to herein as "the system" or "the present system") for increasing availability of an index. To ensure correct functioning of the non-restricted part of the index, the present system guarantees that either all the changes related to a structure modification operation are reflected in the index or none of the changes related to a structure modification operation are reflected in the index. In the latter case all the pages related to the structure modification operation as identified from the log records are placed in a restrictive state.

If the present system is not capable of applying the logs related to part of the structural modification operations (SMO), all the pages of the SMO, not just the pages for which the application of the logs failed, are placed in a restrictive state (e.g., LPL). On the other hand, if the present system fails to apply logs for a non-SMO page, then only that page is placed in the restrictive state.

The present system prevents a transaction from accessing an uncommitted change by means of left and right sentinel pages which are identified by sentinel algorithm. The sentinel algorithm is implemented in the following situation. During undo processing the index is traversed and reaches a non-leaf page that is in the restrictive state. This will prevent the present system from traversing the index and completing the undo operation. As a result, it is possible to leave uncommitted changes in the index that might be visible to a user. To prevent this concern, the sentinel algorithm creates the sentinel pages that protect these uncommitted changes.

The present system also provides a faster method of recovery from a rebuild pending restrictive state. If leaf pages are placed in rebuild pending restrictive state then the present system rebuilds only the index ranges reflected by those leaf pages, The present system rebuilds the protected portion of the index by reformatting one or more of a plurality of leaf pages and inserting one or more of a plurality of keys in one of the leaf pages. The present system generates one or more of a plurality of rebuilt leaf pages. The present system generates one or more of a plurality of new leaf pages. The present system attaches one or more of the rebuilt leaf pages to a non-leaf page. The present system attaches one or more of the new leaf pages to the non-leaf page.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

Figure 1:
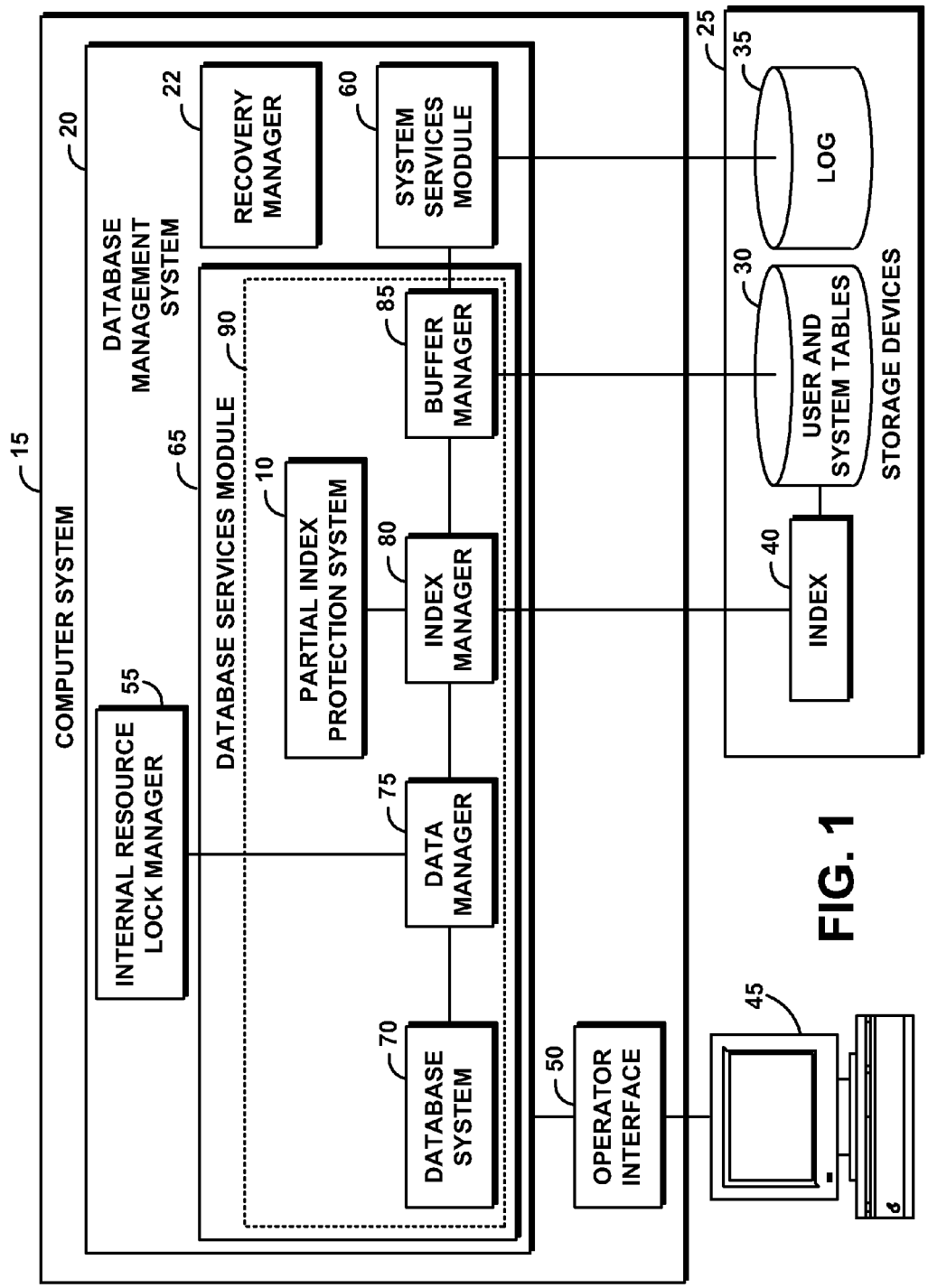
FIG. 1 is a schematic illustration of an exemplary operating environment in which a partial index protection system of the present invention can be used.
Figure 2:
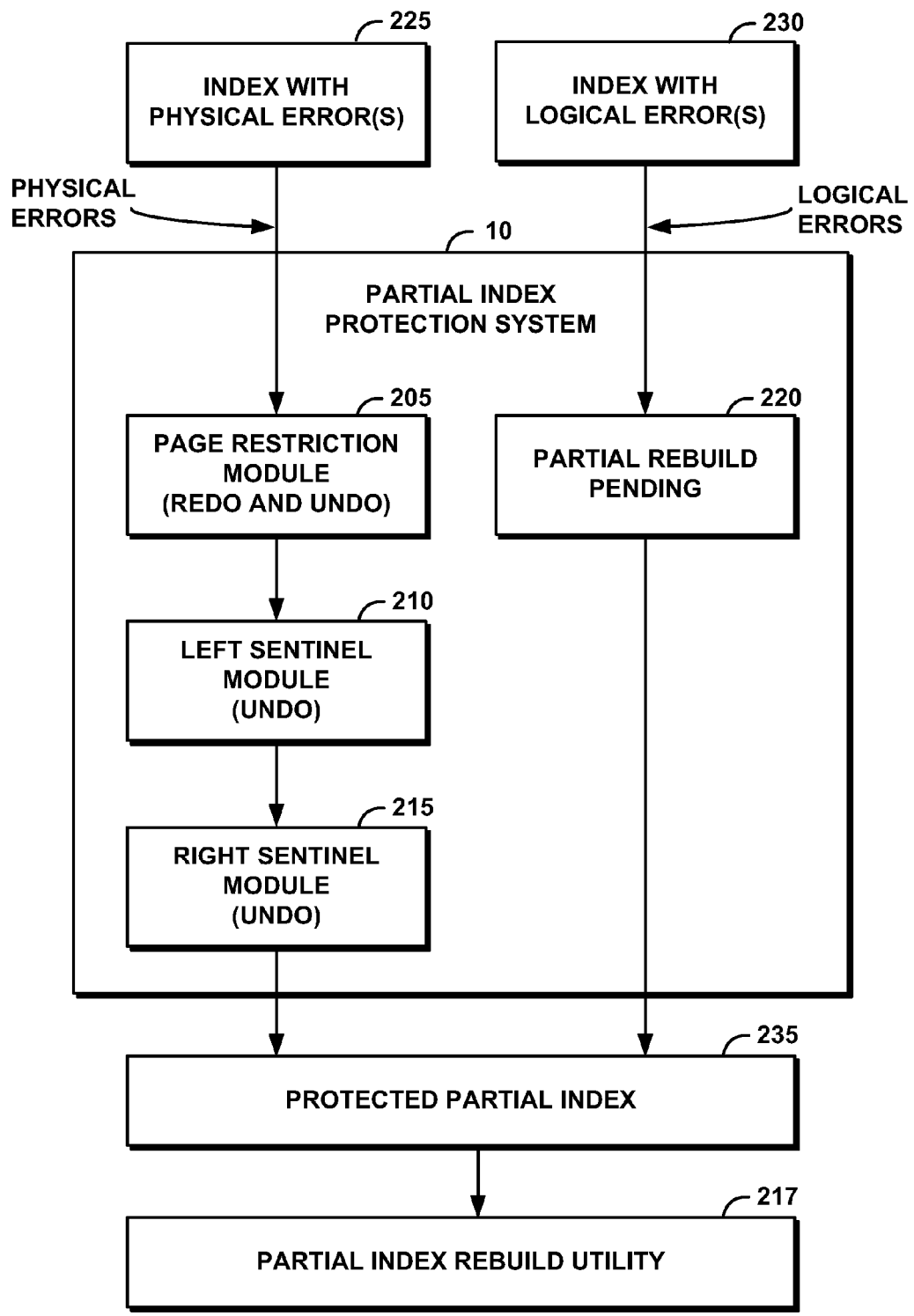
FIG. 2 is a block diagram of a high-level architecture of the partial index protection system of FIG. 1.
Figure 6:
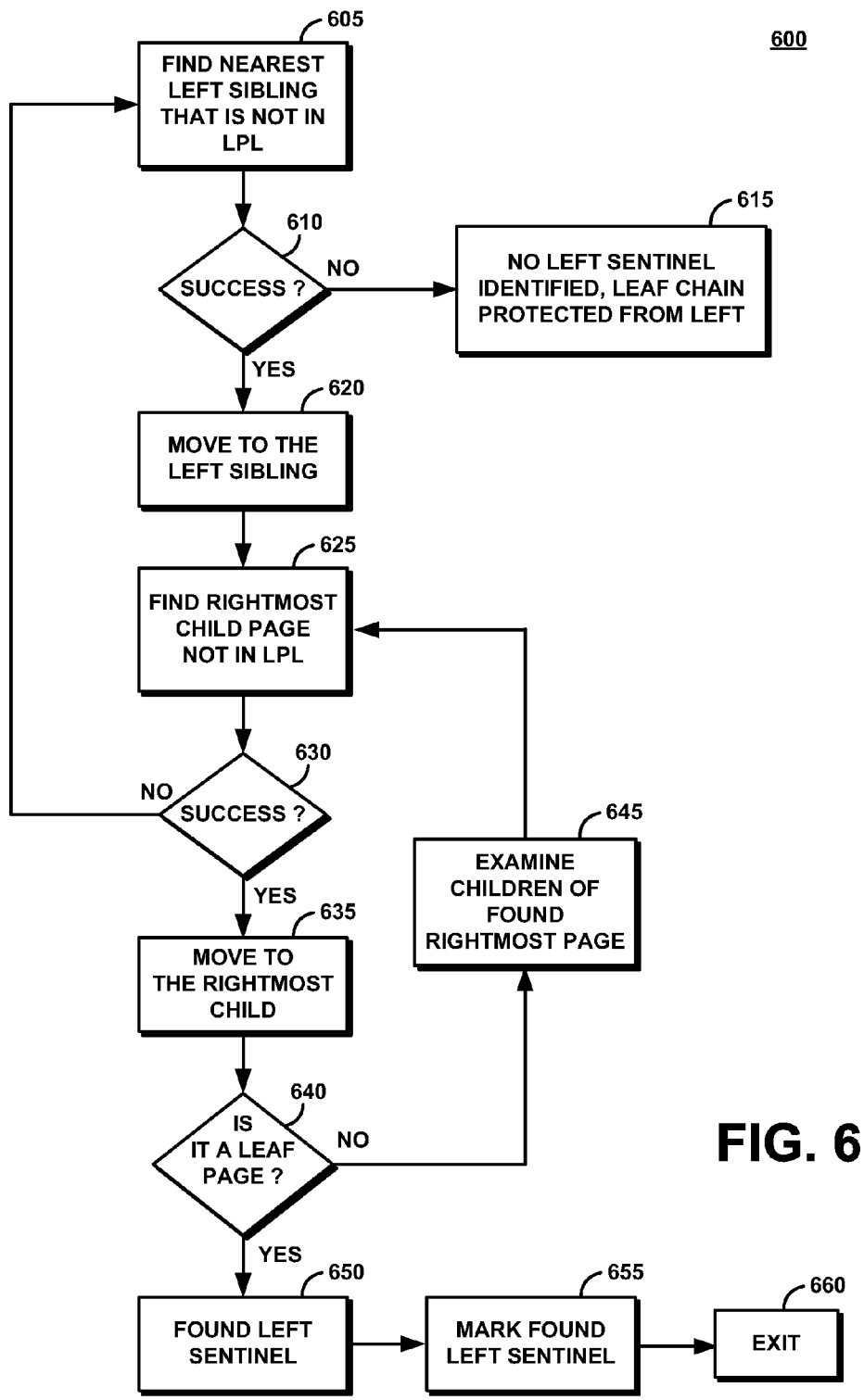
Figure 7:
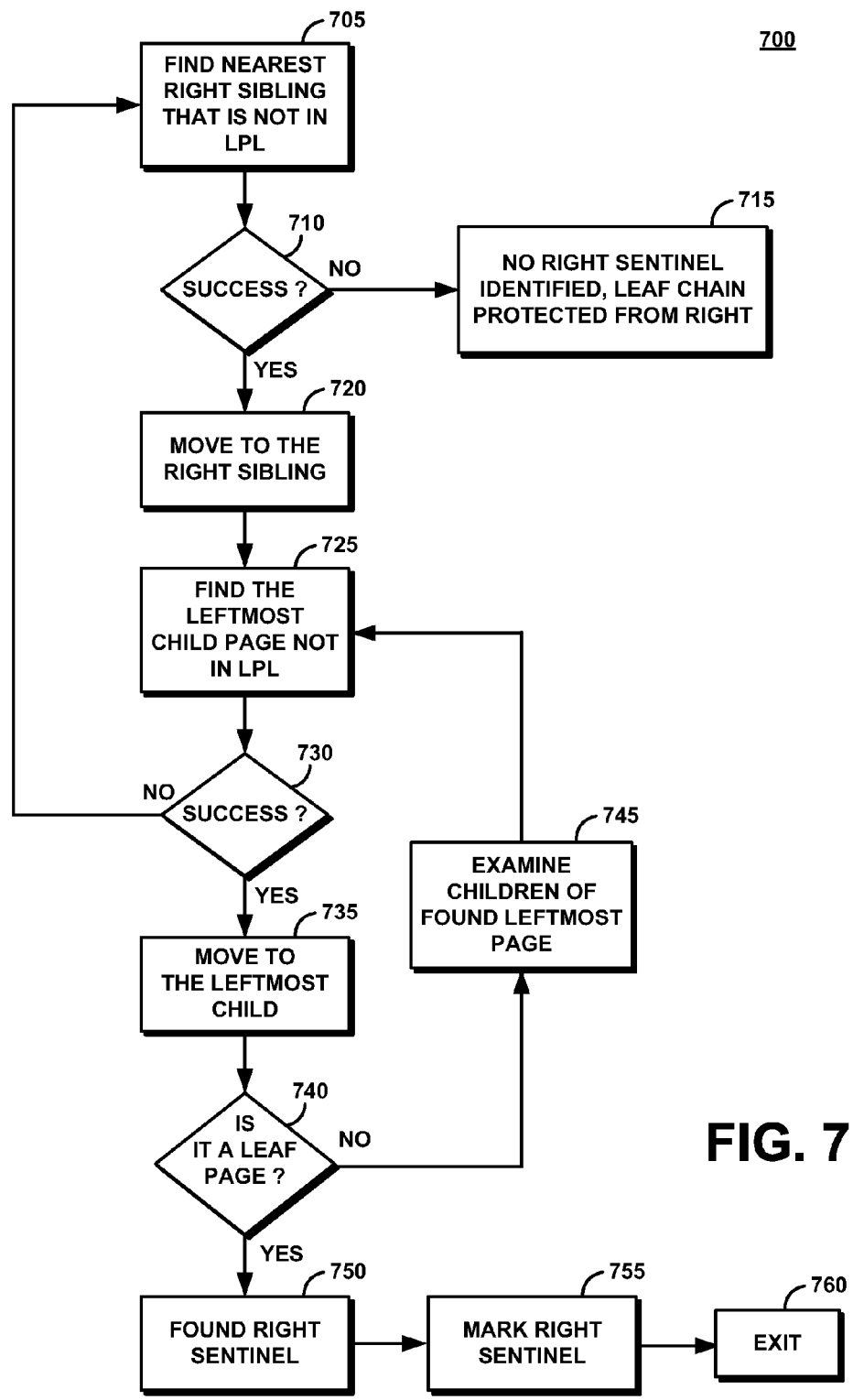
Figure 8:
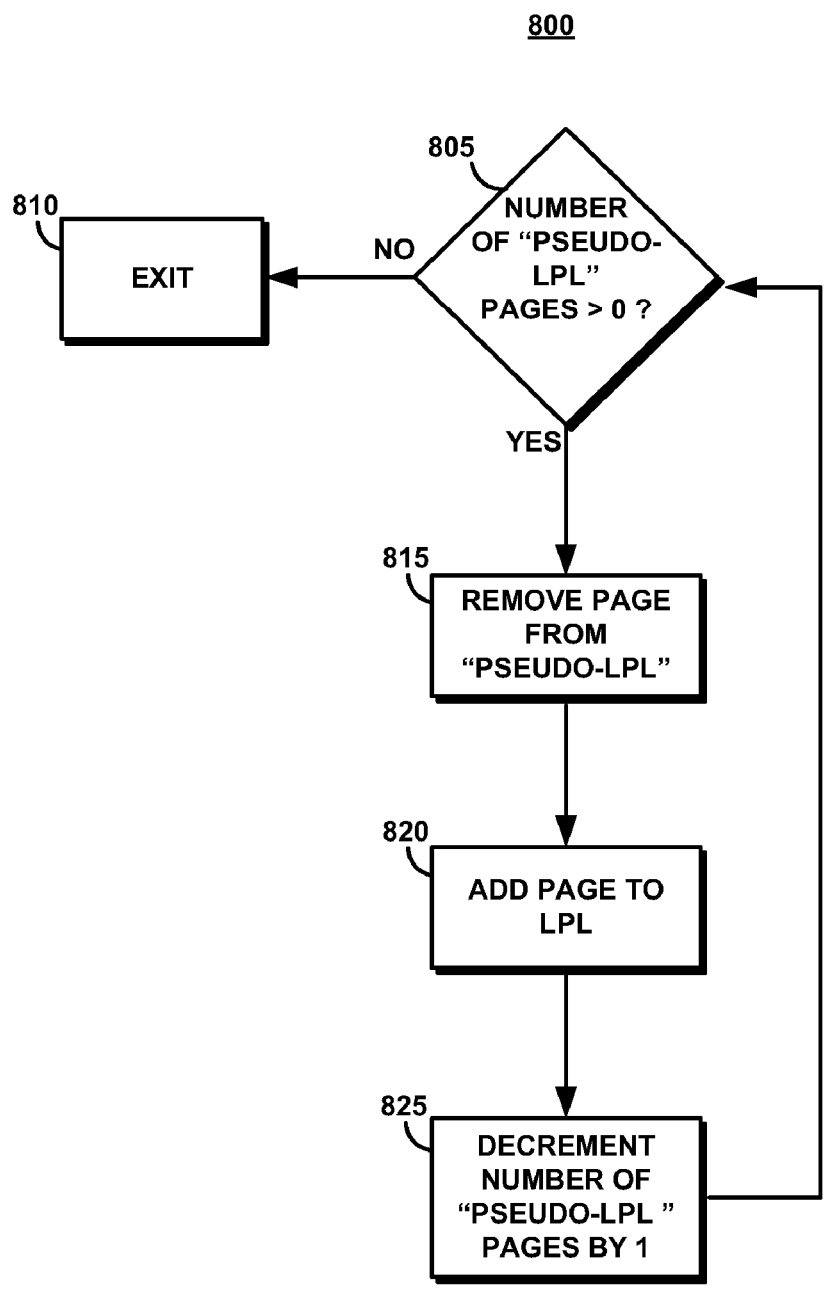
Figure 9:
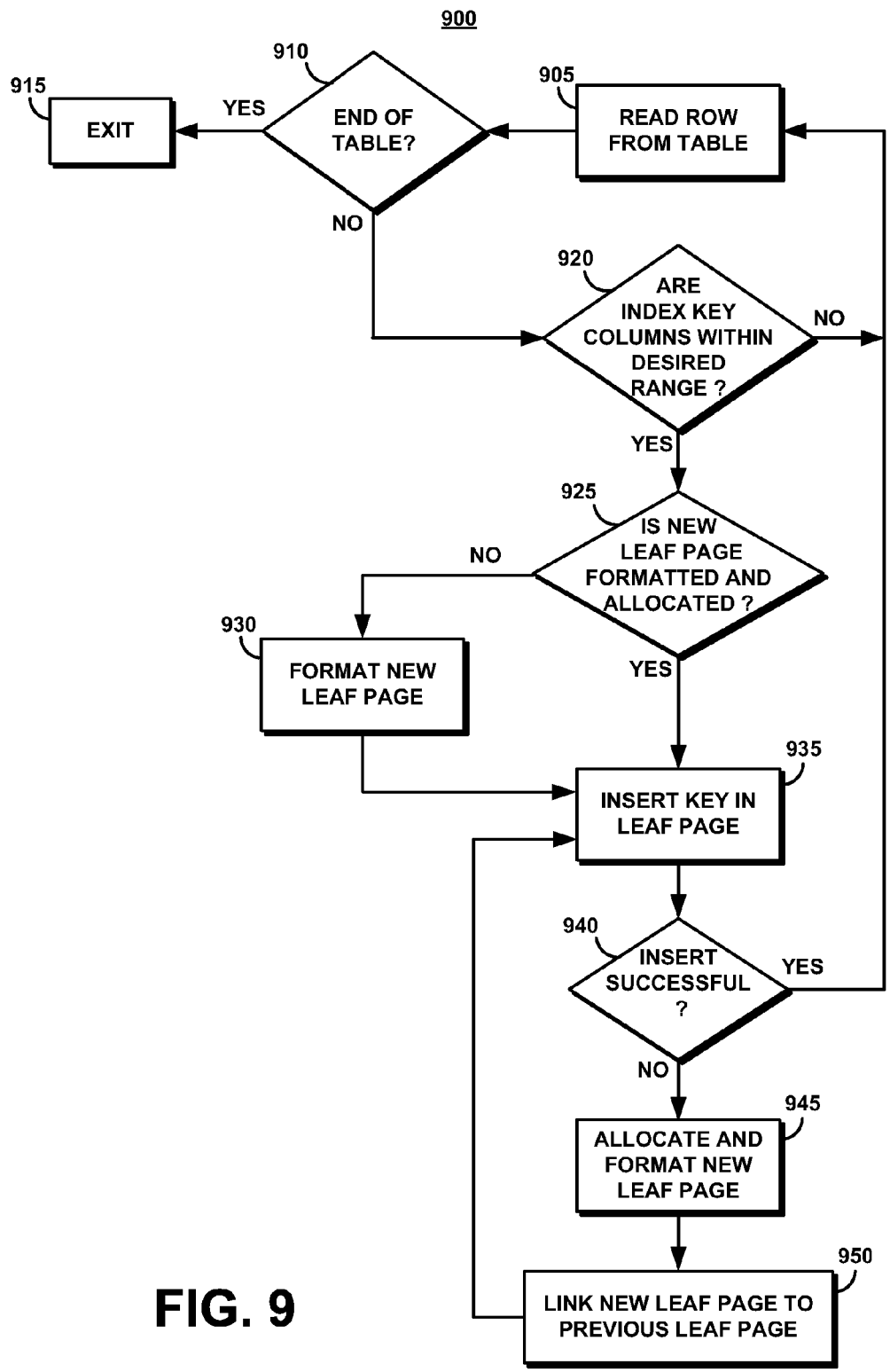
Figure 10:
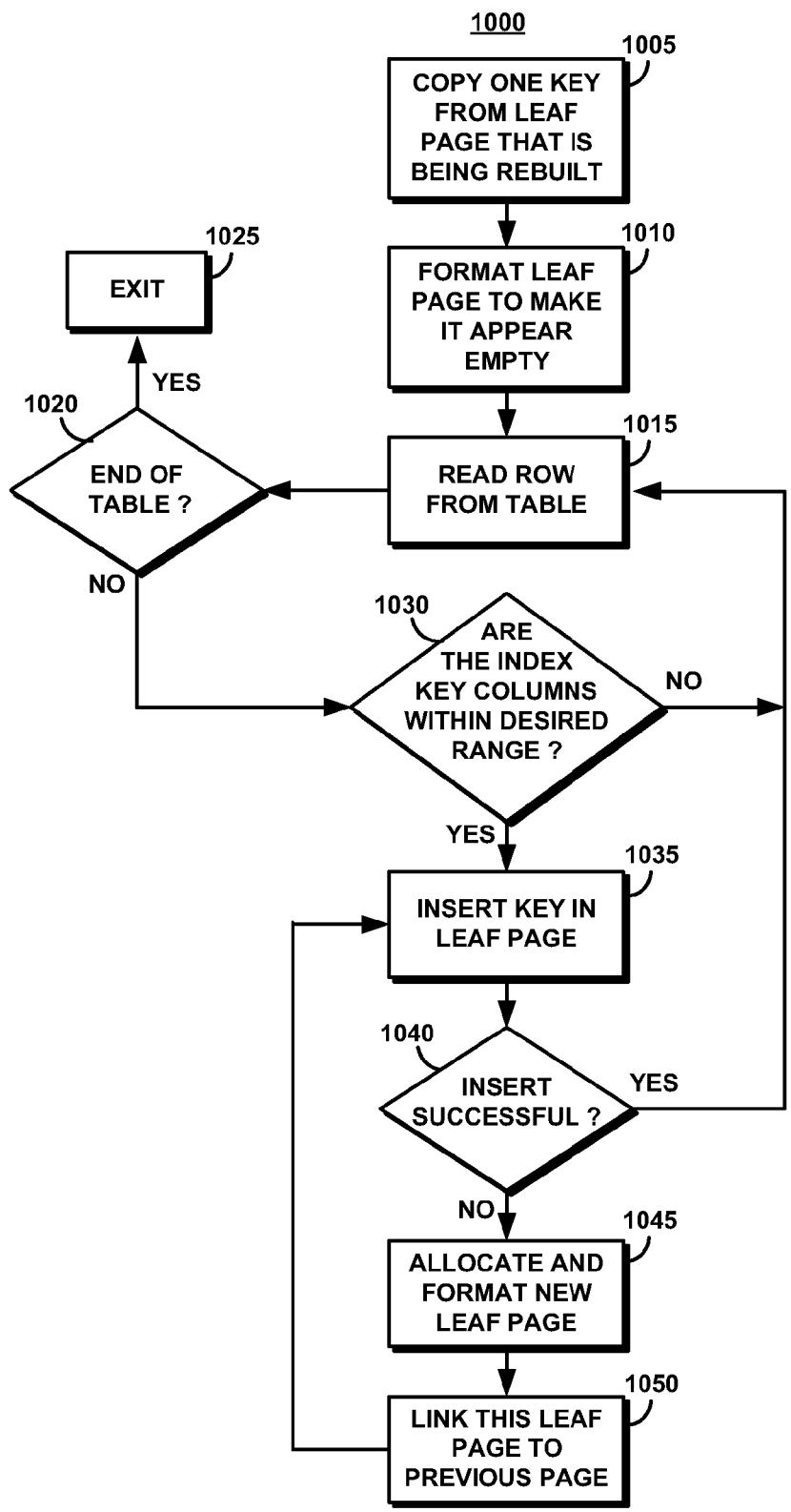
Figure 11:
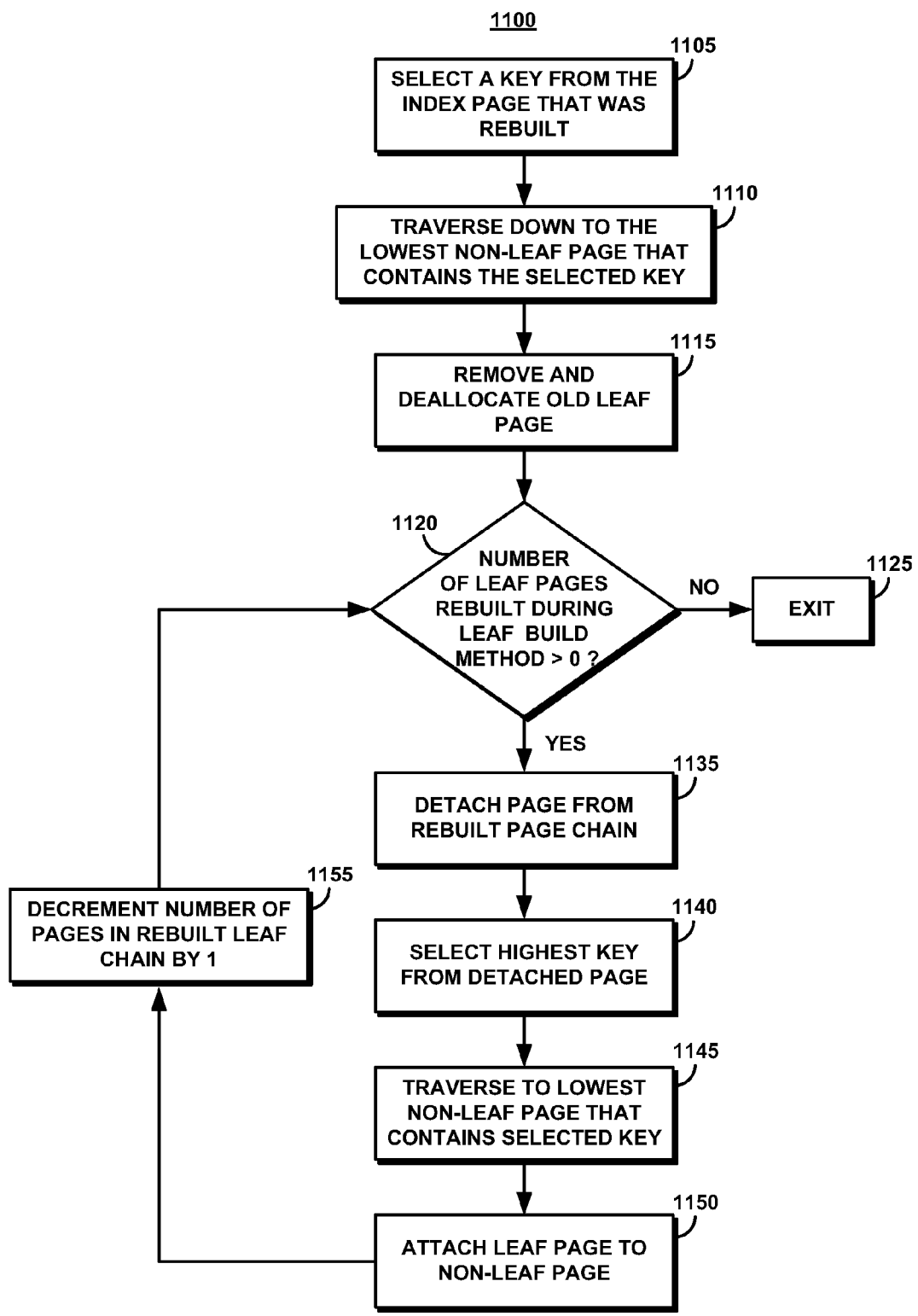
Figure 12:
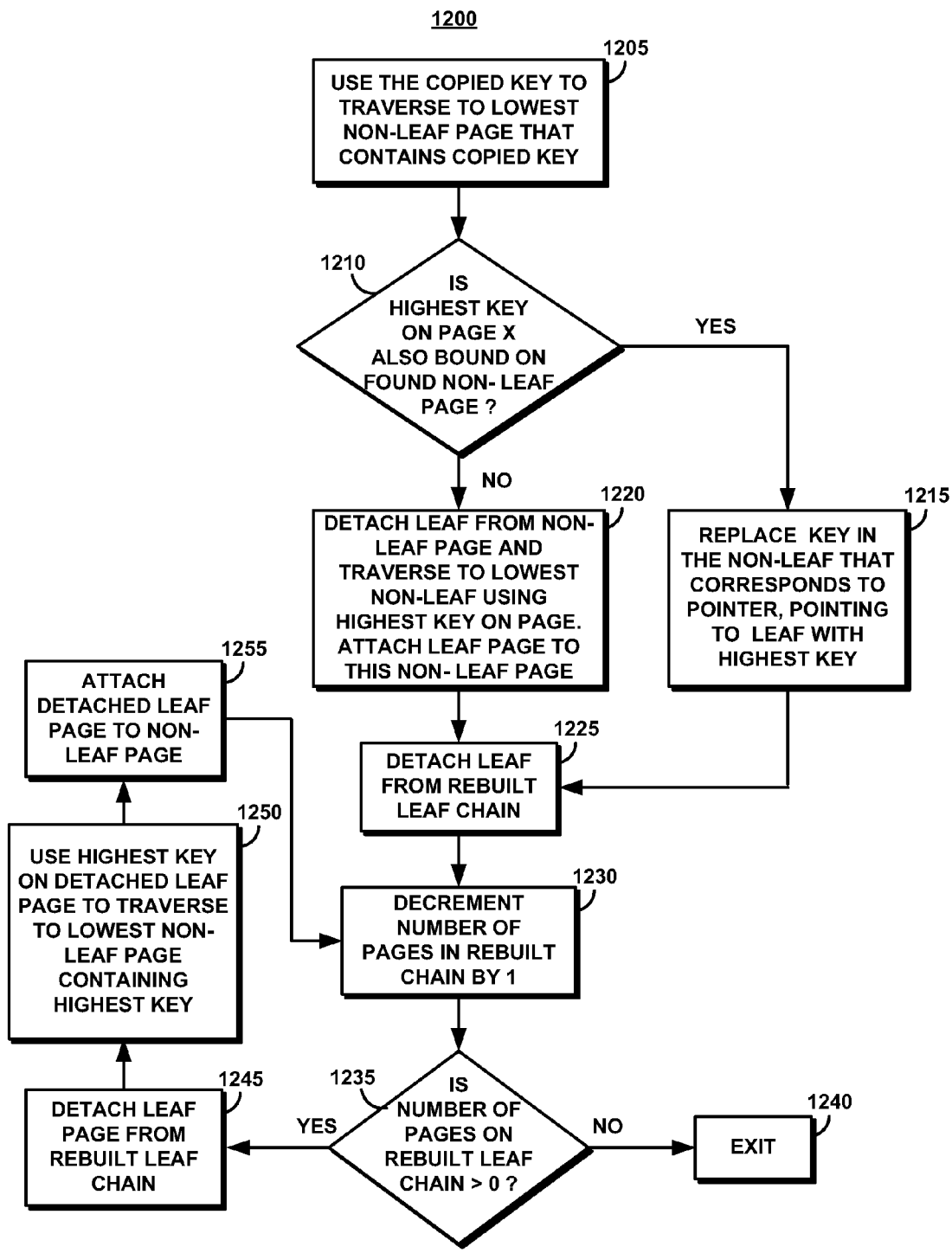
Figure 13:
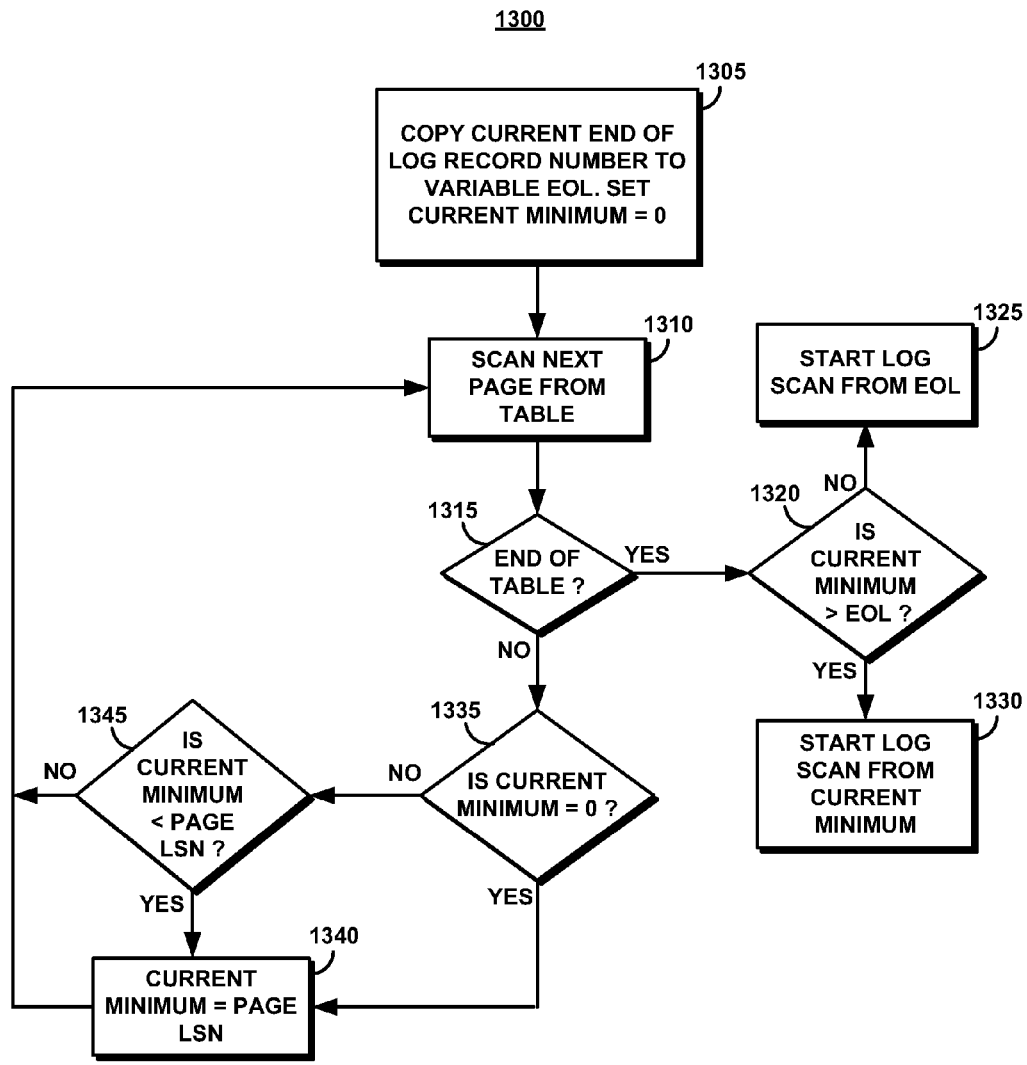

FIG. 6 is a process flow chart illustrating a method of operation of the partial index protection system of FIGS. 1 and 2 in identifying and marking a left sentinel;

FIG. 7 is a process flow chart illustrating a method of operation of the partial index protection system of FIGS. 1 and 2 in identifying and marking a right sentinel;

FIG. 8 is a process flow chart illustrating a method of operation of the partial index protection system of FIGS. 1 and 2 in moving an index page from a pseudo-restrictive state to a restrictive state;

FIG. 9 is a process flow chart illustrating a method of operation of the partial index protection system of FIGS. 1 and 2 in reformatting and inserting a key in a leaf page being rebuilt;

FIG. 10 is a process flow chart illustrating a method of an embodiment of the partial index protection system of FIGS. 1 and 2 in reformatting and inserting a key in a leaf page being rebuilt as compared to FIG. 9 where a new page is formatted and keys inserted into;

FIG. 11 is a process flow chart illustrating a method of operation of the partial index protection system of FIGS. 1 and 2 in attaching a rebuilt leaf page to a non-leaf page to rebuild a partial index, and FIG. 11 illustrates a leaf attachment phase that follows the process of FIG. 9;

FIG. 12 is a process flow chart illustrating a method of operation of the partial index protection system of FIGS. 1 and 2 in attaching a new leaf page to a non-leaf page to rebuild a partial index, and FIG. 12 illustrates a leaf attachment phase that follows the process of FIG. 10; and FIG. 13 is a process flow chart illustrating a method of operation of the partial index protection system of FIGS. 1 and 2 in performing a minimum log sequence number (LSN) computation.

DETAILED DESCRIPTION OF PREFERRED EMBODIMENTS

FIG. 1 portrays an exemplary overall environment in which a system, a computer program product, and an associated method (the partial index protection system 10 or the "system 10") for increasing availability of an index in the presence of physical errors or software bugs may be used. System 10 comprises a software programming code or a computer program product that is typically embedded within, or installed on a computer system 15. Alternatively, system 10 can be saved on a suitable storage medium such as a diskette, a CD, a hard drive, or like devices.

In the exemplary environment of FIG. 1, a computer system 15 comprises a database management system 20 (DBMS 20). The computer system 15 further comprises one or more processors connected to one or more data storage devices 25 that store one or more databases, such as a fixed or hard disk drive, a floppy disk drive, a CDROM drive, a tape drive, or other device. The storage devices 25 comprise user and system tables 30 and a log 35. The user and system tables 30 comprise an index 40.

Operators of the computer system 15, represented by a computer 45, use a standard operator interface 50 to transmit electrical signals to and from the computer system 15 that represent commands for performing various search and retrieval functions against the databases. Computer 45 may also be a monitor or a terminal.

The DBMS 20 comprises an internal resource lock manager 55, a systems services module 60, and a database services module 65. The internal resource lock manager 55 handles locking services. Because the DBMS 20 treats data as a shared resource, any number of users are allowed to access the same data simultaneously. Consequently, concurrency control is required to isolate users and to maintain data integrity. The systems services module 60 controls an overall execution environment of DBMS 20, including managing data sets of log 35, gathering statistics, handling startup and shutdown, and providing management support.

The DBMS 20 includes a recovery manager 22 that is in charge of applying the logs. Logs are applied in two situations: during restart of the system and during rollback of an operation. During restart, a redo phase applies all the redo log records. The redo phase is followed by an undo phase for applying all the undo log records. During rollback, only undo log records are applied. The difference between the redo phase and the undo phase is that during the redo phase the logs are read forward in the order they were written to disk. For example if the following logs are written to the disk in the following order, Log1 (Redo), Log2 (Undo), Log3 (Redo), Log4 (Redo), Log5 (Undo), then during the redo phase the logs are read in a forward direction from Log1 to Log5 and the three Redo logs (Log1, Log3 and Log4) are processed. During the undo phase the logs are read backward from Log5 to Log1 and the undo log records are processed in the following order: Log5 followed by Log2. The undo log record processing during rollback also reads logs in this backward order.

The database services module 65 comprises a database system 70, a data manager 75, an index manager 80, and a buffer manager 85. The buffer manager 85 detects errors while applying log 35 to index 40. System 10 places pages in index 40 associated with an error into a restrictive state. An exemplary restrictive state is a logical page list, or LPL. It should be clear that the invention is applicable as well to, any type of restrictive state.

FIG. 2 illustrates a high-level hierarchy of system 10. System 10 comprises a page restriction module 205, a left sentinel module 210, a right sentinel module 215, and a log apply utility and partial index rebuild utility 217, and presents a method for placing leaf pages in partial rebuild pending state on detection of a logical error 220. The input to system 10 may comprise an index with physical errors 225 or an index with logical errors 230. The output of system 10 is a partially protected index 235.

The page restriction module 205 places pages with structural modification operations (SMOs) in a restricted state for both redo and undo operations. Only for undo operations that cannot be completed because of a non leaf page being in restricted state, the left sentinel module 210 identifies a left sentinel of a group of pages in a restricted state and places the left sentinel in a restricted state. Similarly, and only for undo operations that cannot be completed because of a non leaf page being in restricted state, the right sentinel module 215 identifies a right sentinel of a group of pages in a restricted state and places the right sentinel in a restricted state.

A recovery utility like a log apply utility or a partial index rebuild utility or a total index rebuild utility is run to recover the pages kept in restrictive state. The kind of utility that is run depends on the kind of restricted state the pages are in. If the pages are in LPL, it means they were placed in LPL because of a physical error and a log apply utility is run. If the restricted state is partial rebuild pending, it means that they were placed in that restrictive state because of a logical error and a partial index rebuild utility is run. If the entire index is placed in rebuild pending state then a total index rebuild utility is run. Even if the utilities of 217 are not run, part of the index will be available to the user, wherein the pages placed in LPL or partial rebuild pending are not available to the user.

Placing individual pages in a restricted state during redo requires that the rest of the redo process can be applied to index pages not in a restricted state. This criterion can be met since redo is a physical process for index manager; i.e., redo is page oriented.

Placing individual pages in a restricted state further requires that the undo process following the redo process can be accomplished. During undo, it is possible to traverse the index. When placing individual index pages in restrictive state, the index cannot be left in an inconsistent state with respect to traversal such that undo fails due to inconsistent child pointers. The solution to this issue will be addressed below.

Furthermore, all changes to the index may not be undone during undo since the index manager may not be able to traverse to a leaf page (interchangeably referenced herein as a leaf) where the undo operation needs to be performed. Consequently, the undone or uncommitted changes require protection. The solution to the issue is provided by the left and right sentinels.

Operations that modify the structure of an index comprise splitting a leaf and deleting a leaf. Such an operation is referenced as a structure modification operation (SMO). A partially completed structure modification operation reflected in the index can cause traversal to fail and generate wrong results. For example, a leaf A is split and a new leaf (page B) is added to the index. Leaf C is the leaf that is next to the new leaf B and was previously next to leaf A. A partially completed split might leave leaf A still pointing to C instead of the new page B. A scan of the index along the leaves following the next pointer can skip page B, causing an error. Thus, the index cannot comprise partially completed structure modification operations.

Consequently, system 10 makes structure modification operations atomic with respect to the index. Either all of the effects of a structure modification operation are present in the index or none of the effects are present. Making structure modifications atomic is necessary to ensure that the undo process that follow s the redo process is successful.

Figure 3:
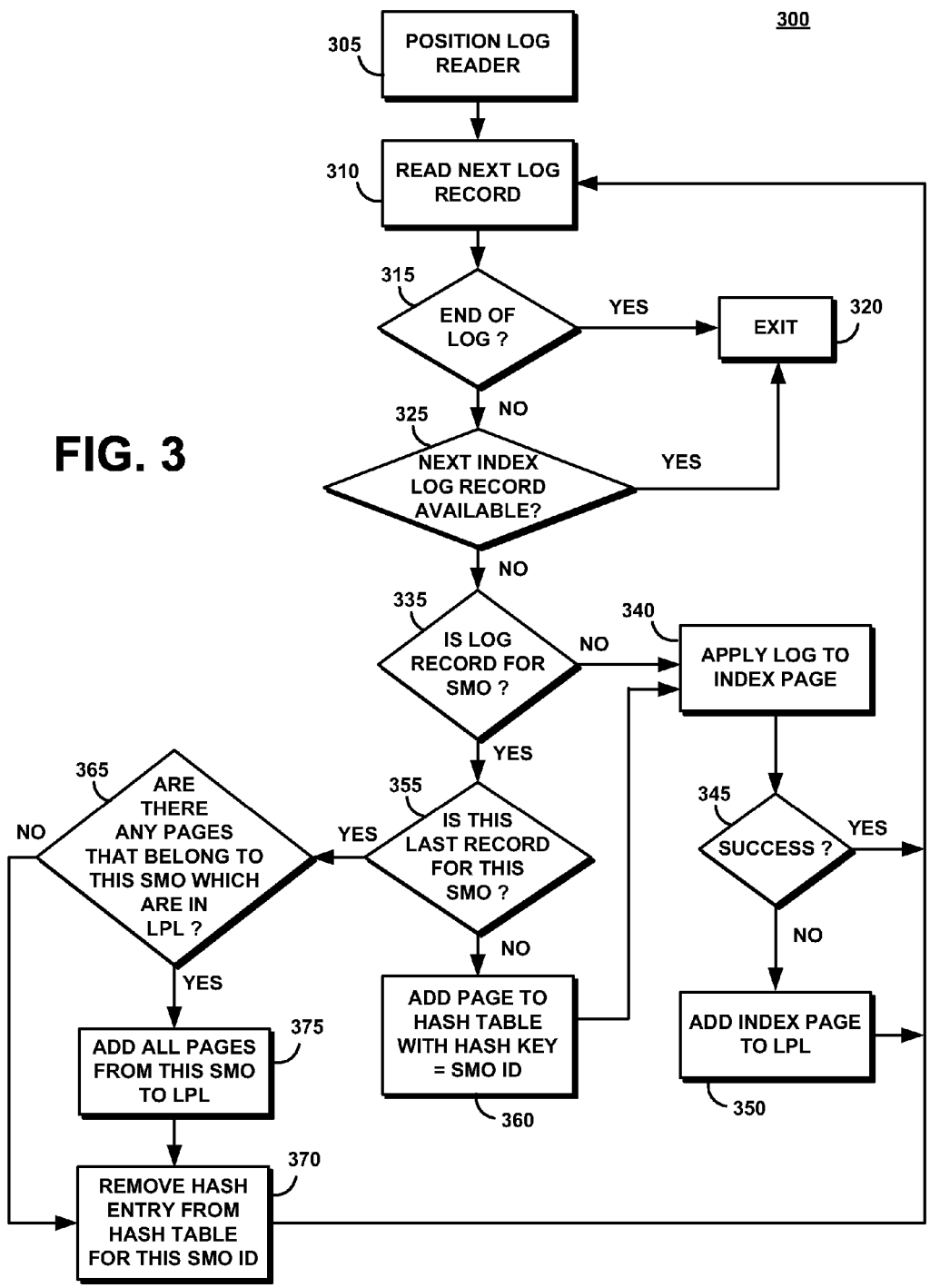
FIG. 3 is a process flow chart illustrating a method of operation of the partial index protection system of FIGS. 1 and 2 in placing individual index pages in a restrictive state because of an error, and further describing special handling required for SMO pages.

FIG. 3 illustrates method 300 that shows how index pages are added to LPL if logs cannot be applied. Furthermore, FIG. 3 illustrates how index pages that were involved in SMO are processed. The page restriction module 205 identifies the pages that belong to a structure modification operation from associated log records by using a hash table.

The hash key of the hash table comprises a transaction ID and an index ID to identify pages that belong in a particular structure modification operation. The hash key contains an index ID to enable the same transaction to update several indexes in parallel. In one embodiment, the index manager 80 serializes structure modification operations. Consequently, at any given point of time there can be only one outstanding structure modification operation per index. Thus, if the hash entry is removed after the last log record is seen for a SMO, the hash key defined above will be unique. In an alternative embodiment, the index manager might allow concurrent SMOs, in which case a unique structure modification ID is required as part of the hash key.

Multiple log records correspond to an SMO, affecting multiple index pages. However, in the hash table there is only one entry corresponding to this SMO. The entry includes the SMO id (which is the hash key needed for lookup) and the index page numbers that are involved in the SMO. Whenever another log record appears for an SMO, method 300 looks up the hash table with the SMO id as the key. If an entry exists then this page number is added to the hash entry. Otherwise, a new hash entry is created with this SMO id and this page number is added to this newly created hash entry The hash entry further comprises page numbers of pages involved in a structure modification operation. When the page restriction module 205 identifies a log record of an initial structure modification, the page restriction module 205 creates an entry in the hash table corresponding to the page number in the log record. As additional structure modification log records belonging to the same hash key are read the page restriction module 205 adds the corresponding page numbers to the created hash entry for that structure modification operation.

The buffer manager 85 positions a log reader at an initial place in a log such as, for example, a beginning of a log (step 305). The log reader is positioned at the log record from which redo starts. The point from which redo starts is computed by the database manager. Usually but not necessarily, the point from which redo starts is not the beginning of the log. The page restriction module 205 reads a next log record (step 310). If the log reader is at the end of the log (decision step 315), the page restriction module 205 exits (step 320). If the log reader is not at the end of the log (decision step 315), method 300 inquires if the next index log record is available (step 325). If the next index log record is available, the page restriction module 205 exits (step 320); otherwise, method 300 proceeds to decision step 335. In FIG. 3 it is assumed that the log reader provides only log records for the index.

If the current log record is not a log record for a structure modification operation (step 335), the index manager 80 applies the current log record to the appropriate index page (step 340). If the application is successful (decision step 345), processing returns to step 310. If the application is not successful, the page restriction module 205 places the associated index page in a restricted state such as, for example, a logical page list (LPL) (step 350), and processing returns to step 310.

If at decision step 335 the current log record is a log record for a structure modification operation, the page restriction module 205 determines whether the current log record is the last record for the current structure modification operation (SMO) (decision step 355). If not, the page restriction module 205 adds the current index page to a hash table with a hash key set to an ID for the structure modification operation (an SMO ID) (step 360).

The index manager 80 applies the current log record to the appropriate index page (step 340). If the application is successful (decision step 345), processing returns to step 310. If the application is not successful, the page restriction module 205 places the associated index page in a restricted state such as, for example, a logical page list (LPL) (step 350), and processing returns to step 310.

If at decision step 355 the current record is the last record for the current structure modification operation, the page restriction module 205 determines whether there are any pages belonging to the current structure modification operation (SMO) that are in the restricted state (LPL) (decision step 365), by looking up the hash entry using the SMO id which is the hash key. If at decision step 365 it is determined that there are pages that belong to the SMO, that are in LPL, the page restriction module 205 adds the rest of the pages associated with the current structure modification operation to the restricted state (LPL) (step 375) and removes the hash entry (step 370). In order to determine whether a page is in a restrictive state like LPL it queries an internal DBMS.

If no pages are in LPL, the page restriction module 205 removes the hash entry from the hash table for the SMO ID associated with the current log record (step 370).

At this stage, method 300 is looking at the last log record for the SMO. There is no index page associated with the last log record it is merely a marker. For this reason, the contents of the last log record are not applied to any index page. There is similarly a first log record for the SMO. The first log record for the SMO is usually associated with an index page and therefore needs to be applied to an index page. However, in another embodiment it is possible to have a first log record for the SMO that is merely a marker without having any content that needs to be applied to an index page.

After the page restriction module 205 removes the hash entry from the hash table for the SMO ID associated with the index page associated with the current log record (step 370) processing returns to step 310. Also removing the hash entry from the hash table reduces the memory requirements.

Another embodiment is to have a unique SMO id for each index. In this alternative embodiment, the hash entry for a particular SMO does not have to be removed after completing the processing of the last log record for the SMO, since there is no possibility of conflict between two SMO hash entries as the SMO ids are unique.

According to another embodiment of the present invention, the SMO id can be uniquely obtained. An SMO typically starts with modifying a space map page. The modification of a space map page will alter the log sequence number field that is maintained on a space map page. This log sequence number corresponds to the log record embodying the last update made to the space map page. Since the SMO will modify the space map page, the log sequence field in the space map page will be updated with the latest log sequence number of the log record that embodies the latest update. Thus, if the SMO id is composed of an index id plus the log sequence field of the space map page it modified, it is possible to obtain a unique SMO id.

As an example, transaction 1 starts an SMO on an index. It will latch a space map page for write. Before it updates the page it notes the log sequence number on the page and creates the SMO id. It then updates the space map page, which modifies the log sequence field, and release the latch. Transaction 2 might then latch the same space map page and it will see the new log sequence field value that was created by transaction 1, and therefore create its own SMO id with this new log sequence number.

The following scenario describes another example of the functioning of method 300 of FIG. 3. If a split involves three pages (pages A, B, and C) comprising two leaves and one non-leaf and the index manager 80 is unable to redo changes related to one of the pages, the page restriction module 205 places all the pages for this SMO in LPL. Pages C, D, and F are part of a succeeding split. In this case, pages D and E are placed in a restrictive state because the splits have page C in common. If page C is placed in a restrictive state, any succeeding SMO that involves page C has associated pages placed in a restrictive state.

While processing log records for a structure modification, the page restriction module 205 does not look up the hash table to see if any of the other pages in the structure modification operation were added to restrictive state. Even if any of previous pages were added to restrictive state, the page restriction module 205 can attempt to redo the log record for this new page before placing this new page into restrictive state.

Figure 4:
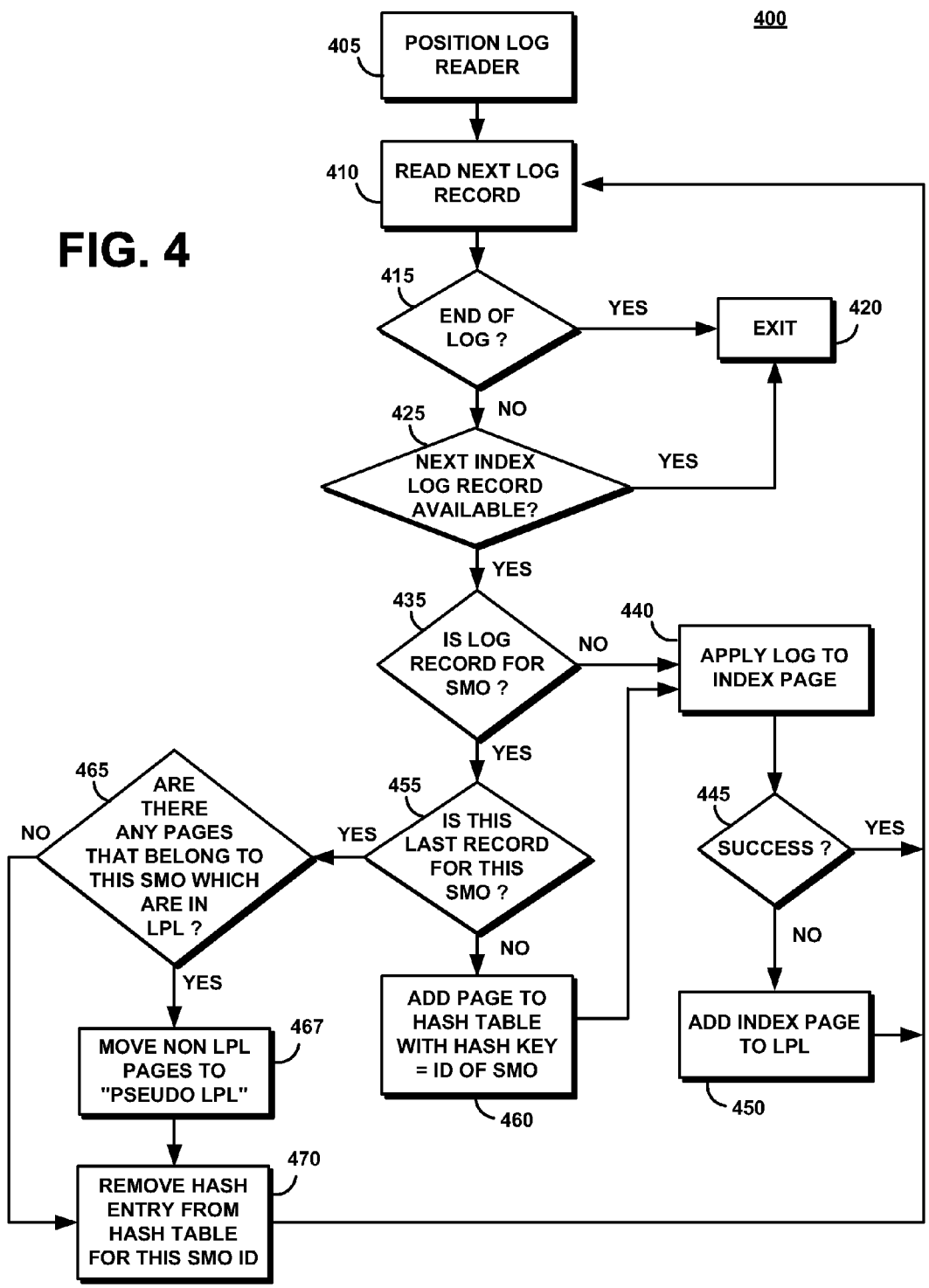
FIG. 4 is a process flow chart illustrating a method of operation of the partial index protection system of FIGS. 1 and 2 in distinguishing between a true restrictive state page and a pseudo-restrictive state page.

Referring now to FIG. 4, it describes method 400 that is generally similar to method 300 of FIG. 3. The difference between methods 300 and 400 can be illustrated by the following example. Suppose pages A, B, and C are involved in an SMO and the present system failed to apply the logs for page A, then method 300 will place A, B, and C in LPL. However, method 400 will place A in LPL, but will place B and C in what is referred to as pseudo-LPL. The logs can continue to be applied for pseudo-LPL pages. At the end of the redo process all the pseudo LPL pages are moved to LPL as shown in FIG. 8.

The pseudo LPL pages are pages that are in a restrictive state by virtue of being in an SMO whose other pages are in LPL. Since method 400 did not fail to apply the log records for pseudo LPL pages, it will continue to apply all the relevant log records to these pseudo LPL pages. It is only at the end of redo process we will have to move them to LPL as the undo process must not see them during index traversal as that might lead to a broken traversal because of inconsistent child pointers. Thus, method 400 does not apply to the undo phase since there are no pseudo LPL pages.

However, method 300 is applicable to the undo phase. In the undo phase, the last log record for the SMO is seen first before any other log record for that SMO is seen, since logs are read in backward fashion during undo as we have described before. While method 300 is applicable to the redo phase, it could be made applicable to an undo phase, where in box 355 the "last record" inquiry is replaced with the "first record" inquiry. It is assumed in this case that the first log record for the SMO is just a marker like the last log record. If the first log record for the SMO also has content that can be applied to an index page, then that content is first applied, and the hash entry for this SMO is removed, adding pages to LPL as necessary Method 400 distinguishes between true restrictive state pages and pseudo-restrictive state pages. The page restriction module 205 performs steps 405 through 465 as described in connection with steps 305 through 365 of method 300 of FIG. 3. If there are any pages that belong to this SMO that are in a restrictive state (LPL) (decision step 465), the page restriction module 205 moves the pages not in the restrictive state (non LPL pages) to a "pseudo-restrictive state" or "pseudo LPL" (step 467). The page restriction module 205 performs step 470 as previously described. In step 467, the non-LPL pages are moved out of this SMO to pseudo-LPL. In box 440 for FIGS. 3 and 4 when an attempt is being made to apply the log, if the index page corresponding to this log record is already in LPL the log cannot be applied. If the index page corresponding to this page is in pseudo-LPL it is still possible to apply the log. If it is not possible to apply the log then the page is moved from non-LPL to LPL or from pseudo-LPL to LPL.

In one embodiment, the page restriction module 205 distinguishes between pages added to a restrictive state because of physical error during redo (referenced as "true restrictive state" pages) and pages that were added to a restrictive state because they were part of a structure modification (referenced as "pseudo-restrictive state" pages). With pseudo-restrictive state pages, the page restriction module 205 continues to apply log records until the pseudo-restrictive state pages become true restrictive state pages. This embodiment improves availability by reducing the amount of work required during restrictive state recovery.

FIG. 8 illustrates a method 800 of the page restriction module 205 in moving an index page from a pseudo-restrictive state to a restrictive state. The page restriction module 205 determines whether the number of pages in pseudo-restrictive state (pseudo-LPL pages) is greater than zero (decision step 805). If it is not, the page restriction module 205 exits processing (step 810). If it is, the page restriction module 205 removes a page from the pseudo-restrictive state (pseudo-LPL) (step 815) and adds the removed page to the restrictive state (LPL) (step 820). The page restriction module 205 decrements the number of pseudo-LPL pages by 1 (step 825), and returns to step 805. Processing continues until no pages remain in pseudo-LPL.

System 10 prevents access to index pages that may comprise uncommitted changes through the use of an index page designated as a left sentinel and an index page designated as a right sentinel. For example, during undo, a non-leaf page in restrictive state may be encountered. Rather than trusting the pointers in the index page in restrictive state, system 10 traverses one level up and descends to the left and right most corners of the index that comprise the leaf pages that are descendents of the non-leaf restrictive state page.

The sentinels are not themselves leaf pages of the non leaf page that is in LPL, since the sentinel algorithms tries to find leaf children of the left and right siblings of the non-leaf page that is in LPL. As discussed earlier, sentinel algorithms are started upon failing during undo, to traverse the index because of a non-leaf page being in a restrictive state like LPL. The sentinels which are themselves leaf pages guard any uncommitted data that might be underneath the non-leaf LPL page. The sentinels prevent access to uncommitted data through a scan along the leaf page chain.

System 10 marks those corner pages as sentinels. The left corner page is the left sentinel; the right corner page is the right sentinel. If such a descent is not possible, the leaf pages are already protected against a scan from the bottom and a left sentinel or a right sentinel are not required.

Figure 5:
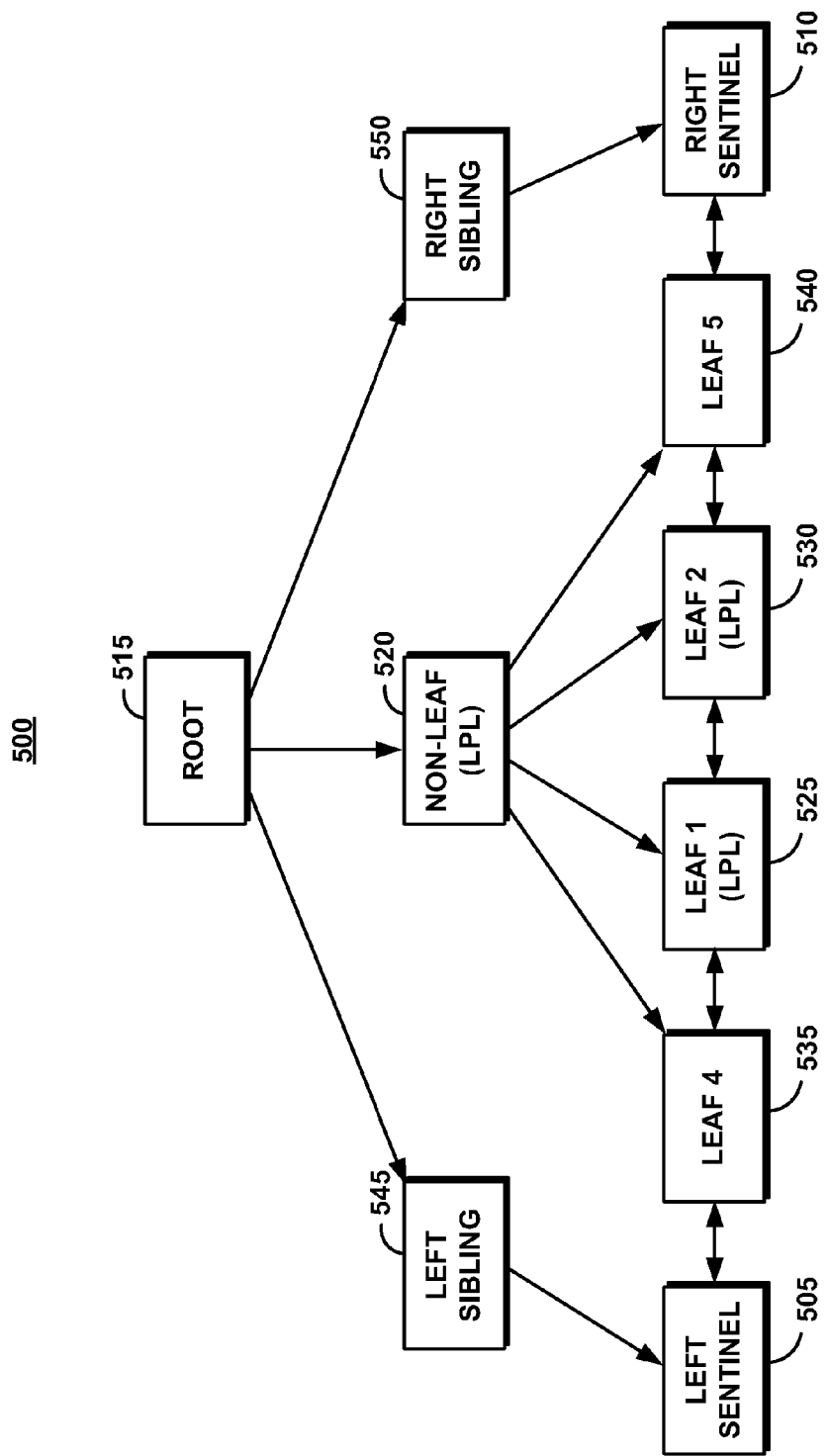
FIG. 5 is a diagram illustrating an exemplary index in which the partial index protection system of FIGS. 1 and 2 identify and place in a restricted state an index page as a left sentinel and an index page as a right sentinel.

FIG. 5 illustrates an exemplary index 500 in which a left sentinel 505 and a right sentinel 510 are identified and placed in a restrictive state (LPL). In another embodiment, the left and right sentinels are marked as such but are not placed in LPL. In this embodiment a scan along the leaf chain will check the sentinel flag on a leaf page. If the flag is set then the scan will not follow the right link if it is a left sentinel and it will not follow the left link if it is a right sentinel. The advantage of marking pages as sentinels as opposed to placing them in LPL is because logs could still be applied to sentinels if they are just marked, whereas if they are placed in LPL logs can no longer be applied. In addition, normal operations on pages that are marked as sentinels could be applied as long as they do not involve the left (or right) link of the right (or left) sentinel.

The index 500 comprises a root 515. The index 500 further comprises a non-leaf page 520, a leaf 1, 525, and a leaf 2, 530 placed in restrictive state (LPL). The non-leaf page 520 has descendent pages not in a restrictive state: a leaf 4, 535, and a leaf 5, 540. Being protected by parent non-leaf 520, leaf 4, 535, and leaf 5, 540 may contain uncommitted changes. A transaction may read these uncommitted changes if the transaction is performing a forward scan or a reverse scan along the leaf pages of index 500.

For each index page in restrictive state, an associated left sentinel is the rightmost descendent of a left sibling reached by traversing a path with no pages in restrictive state starting from the nearest left sibling not in a restrictive state of a non-leaf page that is in a restrictive state. In the exemplary index 500, the nearest left sibling not in a restrictive state is left sibling 545.

For each index page in restrictive state, an associated right sentinel is the leftmost descendent of a right sibling reached by traversing a path with no pages in restrictive state starting from the nearest right sibling not in a restrictive state of a non-leaf page that is in a restrictive state. In the exemplary index 500, the nearest right sibling not in a restrictive state is right sibling 550.

A left sentinel such as left sentinel 505 may not be located if there is no left sibling of non-leaf page such as non-leaf page 520 that is not in restrictive state. In FIG. 5 the left sibling 545 is not in a restrictive state. A right sentinel such as right sentinel 510 may not be located if there is no right sibling of a non-leaf page such as non-leaf 520 that is not in restrictive state. In FIG. 5 a right sibling 550 is not in a restrictive state.

Further, a left sentinel may not be located if there is no path with pages not in a restrictive state from a left sibling down to the leaf chain. A right sentinel may not be located if there is no path with pages not in a restrictive state from a right sibling down to the leaf chain. If no left sentinel is found or if no right sentinel is found, there is no path in the index involving a forward scan along the leaf chain that can encounter uncommitted data. Consequently, a partial index comprising the non-leaf page in restricted state is protected.

In one embodiment, the left sentinel 505 and the right sentinel 510 are not placed in a restrictive state. Having identified the left sentinel 505 and the right sentinel 510 indicates that a leaf page between the left sentinel 505 and the right sentinel 510 may comprise uncommitted changes. In this case, a scan moves past the left sentinel 505 to attempt to complete the undo prevented by the non-leaf LPL 520 in restricted state during traversal from the root 515 of the non-leaf 520. If the operation can be undone, there is no need to place the left sentinel 505 in restrictive state.

This is in contrast with the earlier embodiment where the sentinels are just marked, and where it is not necessary to follow the leaf chain to undo an operation. During an undo operation while traversing the index from the root to the leaf, if a non-leaf page is encountered in LPL, the sentinel algorithm is initiated. If a left sentinel is reached and it is possible to traverse right to actually undo the original operation then the change is undone and a sentinel is not created.

If the operation cannot be undone after crawling through a few leaf pages, then the current page will either be marked as a left sentinel or placed in LPL. Thereafter, an attempt will be made to similarly locate the right sentinel. Upon locating the right sentinel, an attempt is made to similarly move left to undo the original operation. If successful, no right sentinel is marked and the corresponding left sentinel is removed as well. On the other hand, if after a left scan the operation is not undoable, the current page is marked as a right sentinel.

With the sentinels in place and with the pages that are placed in LPL during redo as described in FIG. 3, a user will no longer be able to reach uncommitted data at the end of the restart, that is at the end of redo and undo phase. Uncommitted data is either on a page that is in LPL or is in a non-LPL page that is protected by the sentinels and the non-leaf page in LPL which triggered the sentinel algorithm.

With further reference to the exemplary index 500 of FIG. 5, FIG. 6 illustrates a method 600 of the left sentinel module 210 in identifying a left sentinel and placing the left sentinel in restricted state. As described earlier, in order to identify the leaf page as a sentinel there are two choices: place it in LPL, or mark it as a sentinel (left or right). In the latter case, a scan and other operations on the leaf pages will consult this flag on the page to decide whether to follow the left or right link. The left sentinel module 210 finds a nearest left sibling that is not in restricted state; i.e., the left sibling 545 (step 605). If a nearest left sibling is not found (decision step 610), no left sentinel is identified; the leaf chain is protected from the left (step 615).

If at decision step 610 a nearest left sibling is found, the left sentinel module 210 moves to the left sibling (step 620); e.g., the left sibling 545. The left sentinel module 210 finds a rightmost child page of the found nearest left sibling that is not in a restricted state (LPL) (step 625). In the example of FIG. 5, the rightmost descendent page of the left sibling 545 is left sentinel 505.

If a rightmost child page is not found (decision step 630), the left sentinel module 210 finds the nearest left sibling of the found left sibling that is not in LPL by returning to step 605. Steps 605 through 630 are repeated until a nearest left sibling that is not in LPL is found with a rightmost child page not in LPL or until the left sentinel module 210 determines that no left sentinel can be identified.

If a rightmost child page is identified (decision step 630), the left sentinel module 210 moves to the rightmost child (step 635). The left sentinel module 210 determines whether the found rightmost child is a leaf page (decision step 640). If not, the left sentinel module 210 examines the children of the found rightmost page (step 645), and returns to step 625. Steps 625 through 645 are repeated until a rightmost child is found that is a leaf page (decision step 640. The left sentinel module 210 identifies the found rightmost child as the left sentinel (step 650), marks the found rightmost child as the left sentinel (step 655), and exits (step 660). In one embodiment, the left sentinel module 210 places the found rightmost child in a restricted state (LPL).

With further reference to the exemplary index 500 of FIG. 5, FIG. 7 illustrates a method 700 of the right sentinel module 215 in identifying a right sentinel and placing the right sentinel in restricted state. As discussed earlier, in an alternate embodiment it just marks the found page as a right sentinel. The right sentinel module 215 finds a nearest right sibling that is not in restricted state; i.e., right sibling 550 (step 705). If a nearest right sibling is not found (decision step 710), no right sentinel is identified; the leaf chain is protected from the right (step 715).

If at decision step 710 a nearest right sibling is found, the right sentinel module 215 moves to the right sibling (step 720); e.g., right sibling 550. The right sentinel module 215 finds a leftmost child page of the found nearest right sibling that is not in a restricted state (LPL) (step 725). In the example of FIG. 5, the leftmost descendent page of right sibling 550 is right sentinel 505.

If a leftmost child page is not found (decision step 730), the right sentinel module 215 finds the nearest right sibling of the found right sibling that is not in LPL by returning to step 705. Steps 705 through 730 are repeated until a nearest right sibling that is not in LPL is found with a leftmost child page not in LPL or until the right sentinel module 215 determines that no right sentinel can be identified.

If a leftmost child page is identified (decision step 730), the right sentinel module 215 moves to the leftmost child (step 735). The right sentinel module 215 determines whether the found leftmost child is a leaf page (decision step 740). If not, the right sentinel module 215 examines the children of the found leftmost page (step 745), and returns to step 725. Steps 725 through 745 are repeated until a leftmost child is found that is a leaf page (decision step 740). The right sentinel module 215 identifies the found leftmost child as the right sentinel (step 750), marks the found leftmost child as the right sentinel (step 755), and exits (step 760). In one embodiment, the right sentinel module 215 places the found leftmost child in a restricted state (LPL).

To guarantee correct operations of an index after portions of the index have been placed in restrictive state, system 10 satisfies the following constraints. After portions of the index are placed in restrictive state during redo, the rest of the redo operations are required to succeed. The undo phase that follows redo often entails traversing the index. Such traversals should not lead to wrong results, because portions of the index are in restrictive state. System 10 guarantees that portions of the index that are not in restrictive state are navigable. At the end of undo, an index with portions in restrictive state is made available for use by other transactions. System 10 ensures that uncommitted changes in the index that cannot be backed out during the undo phase are not available to other transactions through a normal root to leaf index traversal or a scan along the bottom of the index tree.

As explained earlier, the system can guarantee success in redo operations since the redo phase is page-oriented; system 10 introduces no changes to that paradigm. Further, system 10 prevents wrong results when the index is traversed by ensuring that no partially completed structure modification operations are present in the portions of the index tree that are in a non-restrictive state. Consequently, system 10 protects against following the wrong pointer when the index system is traversed. A transaction may able to read uncommitted changes by traversing the index from root to a leaf or by traversing the leaf chain. The transaction cannot read uncommitted data by a root to leaf traversal because if there were any uncommitted data it would have been removed by the undo phase. Any path from root to leaf that does not comprise any pages in a restrictive state containing uncommitted data allows data to be rolled back during the undo phase. As far as traversing the leaf chain goes, sentinels guard against accessing uncommitted data. System 10 blocks access to any uncommitted change on a page that is not in a restrictive state.

The hash entry comprises bits to indicate status of the restrictive state (restrictive state status). One bit (a page bit) indicates the restrictive state status of the index pages except a space map page involved in a structure modification. Another bit (a space map bit) indicates the restrictive state status of the space map page.

The hash entry bits are needed to provide the following optimization, whereby either all the changes due to a SMO are reflected in the index, or none at all. Every SMO modifies a space map page. Thus, placing a space map page in LPL affects numerous SMOs since they may have this space map page in common. It is desirable to have as much of the index as possible in non-restricted state. So it would be desirable to provide an optimization whereby the space map page is kept out of LPL.

As described earlier, if there are two SMOs that share a page and if that page goes into LPL then all the pages in both the SMOs go into LPL. Since a space map page may be common to many SMOs if it goes into LPL then all the pages in all the SMOs that have this space map page in common will go into LPL as well.

As an example, consider two SMOs, SMO1 affects space_map_page_1, page A, page B and page C, and SMO2 affects space_map_page_1, page D, page E and page F. The two SMOs share only the space_map_page_1 in common. Assuming that while processing SMO1 page A is placed in LPL, then every page in SMO1 including space_map_page_1 is placed into LPL. So every page in SMO2 will go into LPL.

If a log record that is read represents a space map page modification during a SMO, and the space map page is in restrictive state, the page restriction module 205 marks the space map bit in the hash entry. If the space map page is not in a restrictive state but the process of applying the log record causes the space map page to be added to restrictive state, the page restriction module 205 marks the space map bit.

The page restriction module 205 may determine when processing a log record for a non space-map page that the space map bit in the hash entry is already marked. If so, the page restriction module 205 does not attempt to apply the log record since the page to which the log record applies may not have been allocated. The page restriction module 205 adds the page number to restrictive state.

If a non-space map page is in a restrictive state when initially encountered by the page restriction module 205, the page restriction module 205 marks the page bit in the hash entry. In this case, there is no need to apply the log record. If the page is not in restrictive state, the page restriction module 205 attempts to apply the log record. If the process of applying the log causes the page restriction module 205 to add the page to a restrictive state, the page restriction module 205 marks the page bit in the hash entry.

After system 10 has processed the last log record for a structure modification, system 10 removes the hash entry for this structure modification from the hash table. If any of the non space-map pages belonging to the structure modification operation are in a restricted state as indicated by the page bit, the page restriction module 205 places the non space-map pages in restrictive state. If the space map bit is marked then the system places the space map page for this SMO in LPL otherwise it does not. Thus non space map pages and the space map are treated differently.

Space maps as the name suggest is a directory of the pages that are currently being used by the index and those that are empty and not being used by the index. So the main operations on a space map page are allocation and deallocation of index page.

If a log is applied regarding page deallocation to a space map page, this implies that a bit in the space map will be turned off. If the page whose deallocation is marked in the space map is in LPL, then the page will be taken out of LPL so that during recovery this page will not be built or no logs will be applied to it, unless of course later on during log apply this page gets allocated and subsequently moved to LPL again.

Considering now the scenario where a log is applied regarding page allocation to a space map page, this implies that a bit in the space map will be turned on. The situation does not occur where the page whose allocation is marked is already in LPL, as this is either an allocation of a previously deallocated page (which scenario is described earlier), or this is an allocation of a page that has never before gone through the allocation-deallocation cycle, in which case the page will not be in LPL to begin with. Thus, the present space map optimization does not lead to an inconsistent outcome.

In one embodiment, the page restriction module 205 does not distinguish between space map and non-space map pages with respect to their restrictive state status. In this embodiment, only one bit in the hash entry is required. This bit indicates whether any pages related to this SMO are in restrictive state. If this bit is marked, then at the end of processing log records for a SMO the page restriction module 205 places index pages and the space map page for this SMO in a restrictive state.

The page restriction module 205 does not place a space map page in restrictive state unless necessary. If the redo on a space map page succeeds but the redo on another page involved in the structure modification fails, the page restriction module 205 does not put the space map in restrictive state. The page restriction module 205 places a space map page in a restrictive state only if redo fails for that space map page.

An undo phase often entails traversing the index. System 10 ensures that such traversals do not lead to wrong results even though portions of the index are in restrictive state. During undo for physical errors, system 10 is able to put index pages in restrictive state while maintaining the traversability of the non-restrictive portion of the index. System 10 is able to perform as a partial index even if there is no redo phase (as for a mainline rollback) or even if the redo phase in restart has not placed any index pages in restrictive state. There are two correctness criteria: (1) maintain the traversability of the index, and (2) do not allow users to see uncommitted changes. The first correctness criterion is satisfied by the present invention in that either all the changes due to an SMO are present or none is present. The second correctness criterion is satisfied by the present sentinel algorithm.

At the end of undo, the index with portions in a restrictive state is made available for use by other transactions. System 10 ensures that uncommitted changes in the index that cannot be backed out during the undo phase are not available to other transactions through a normal root to leaf index traversal or a scan along the bottom of the index tree.

System 10 recognizes pages that belong to a structure modification. Consequently, system 10 can place the pages of a structure in restrictive state if any of the pages or a structure is placed in restrictive state. This ensures that the results of a structure modification are either fully reflected in the index or not at all.

Regarding the changes needed for the undo processing, in order to undo an insert to a leaf page, or delete from a leaf page, an attempt is made to access the leaf page recorded in the undo log record. If the key whose insert or delete is to be undone is not on the page because of a structure modification, then the index is traversed to get to the correct leaf page. The initial get page operation might fail because the leaf page is in LPL, because at this stage, it is unknown if the key is present on the page in LPL or is present elsewhere in the index. The index still needs to be traversed.

In the case of a logical error, the index manager 220 performs partial rebuild of the index. When the index manager 220 initiates the partial rebuild, the table is assumed to comprise consistent data. Consistent data in the table is achieved by placing data pages in a restrictive state if a logical error is detected and correcting these data pages before performing a partial index rebuild.

If the logical error is detected on a leaf page, the index manager 220 knows the bounds of the key on this leaf page by examining the leaf page to the immediate left and the leaf page to the immediate right. The index manager 220 scans the table with this bound as a between predicate and rebuilds an index leaf page. If the logical error occurs on a non-leaf page, the entire index is rebuilt.

When a logical error is detected on a leaf page, the index manager 220 marks only the leaf page as "rebuild pending". If an index leaf page is placed in rebuild pending state due to a logical error, it is possible to allow two different types of behavior after restart, depending on which partial index building algorithm (online or non-online) is implemented. Reference is made to the key range covered by the leaf key that is placed in rebuild pending as the RANGE.

If it is a non-online partial index rebuilding algorithm, then no updates will be allowed to the table and the index that falls in the RANGE. Alternatively, updates that fall outside the RANGE are allowed to both the table and the index.

If it is a online partial index rebuilding algorithm, then updates to the table will be allowed only for keys that fall within the RANGE. Alternatively, updates are allowed to both the table and the index for keys that fall outside the RANGE. If it is a unique index then in the case of online index rebuild no updates are allowed for keys that fall within the RANGE.

If a logical error is detected during undo when some of the index pages are already in a restricted state, the index manager 220 places the entire index in rebuild pending because of the physical error. Otherwise, the index manager 220 can run the restricted state recovery procedure (which, as discussed earlier, is a log reapply utility) to correct for the physical errors and then run the partial rebuild procedure.

Similarly, the index manager 220 can choose to place the entire index in rebuild pending if, after placing an index page in rebuild pending, a physical error is discovered in undoing a split on a different page that causes the page to be placed in a restricted state. Otherwise, the index manager 220 can run the restrictive state recovery and then run the partial rebuild procedure.

The partial rebuild of the index can be triggered after the restart process is complete. Otherwise, a user can invoke a utility that performs the partial rebuild. After running the partial index rebuild utility a check index utility needs to be run. A check index utility determines if the index is consistent, because the partial rebuild utility is quite aggressive as it builds leaf pages for only keys within a range. This might not make the index consistent. So, if the check index utility determines that the index is not consistent, a full index rebuild will need to done.

FIG. 9 (leaf rebuild) illustrates a method 900 for rebuilding a partial index. Method 900 reformats one or more leaf pages and inserts one or more keys directly into the reformatted leaf pages, generating one or more rebuilt leaf pages and one or more new leaf pages (method 900, FIG. 9). The index rebuilding module 220 attaches one or more rebuilt leaf pages to one or more non-leaf pages (step 1100, FIG. 11 leaf attachment). Another alternative to partial rebuild algorithm is shown in FIGS. 10 (leaf rebuild) and 12 (leaf attachment).

FIG. 9 illustrates a method 900 of the index manager 220 in reformatting a leaf page that is in rebuild pending and inserting a key into the reformatted leaf page. The index manager 220 reads a row from a table on whose columns the index is built (step 905). The index manager 220 determines whether the end of the table has been reached (decision step 910). If so, the index manager 220 exits processing (step 915).

If the end of the table has not been reached (decision step 910), the index manager 220 determines whether index key columns in the read row are within a desired range (decision step 920). If not, the index manager 220 returns to step 905 and reads another row from the table. The index manager 220 knows the leaf page it is rebuilding. Since the keys are being inserted in new leaf page(s), step 925 determines if a new leaf page is allocated and formatted. If not, the index manager 220 formats a new leaf page (step 930). FIG. 10 differs in that the existing leaf page that is in rebuild pending is reformatted and the keys are inserted into that page.

The index manager 220 inserts a key in the formatted leaf page (step 935). The index manager 220 determines whether the insert was successful (decision step 940). If yes, the index manager 220 returns to step 905. If the insert is not successful (decision step 940), the index manager 220 allocates and formats a new leaf page (step 945). The index manager 220 links the new leaf page to the previously formatted leaf page (step 950) and returns to step 935 to insert the key in the new leaf page.

If the number of keys exceeds what can be added to the page, the index manager 220 allocates a new page and continues adding keys. If the keys are being added after being sorted, the index manager 220 splits asymmetrically, as is common with load, otherwise the index manager 220 splits symmetrically. This split applies to building leaf pages rather than insertion into non-leaf pages.

For example, in the rebuild leaf phase three leaf pages G, H, and K are built. The keys in leaf G are less than the keys in H and the keys in H are less than the keys in K. When building up these leaf pages from sorted keys, the index manager 220 asymmetrically splits G when G is full. In this asymmetrical split, the index manager 220 keeps, for example, 90% of the keys in leaf G and moves 10% of the keys to a new leaf page H. When building these leaf pages without sorting initially, the index manager 220 performs a fifty-fifty split of page G.

FIG. 10 illustrates a method 1000 of an embodiment of the index manager 220 in reformatting leaf pages and inserting in a leaf page being rebuilt. The index manager 220 copies a key from a leaf page that is being rebuilt (step 1005). The index manager 220 reformats the leaf page to make it appear empty (step 1010).

The index manager 220 reads a row from a table (step 1015). The index manager 220 determines whether the end of the table has been reached (decision step 1020). If yes, the index manager 220 exits processing (step 1025). If the end of the table has not been reached (decision step 1030), the index manager 220 determines whether index key columns in the read row are within a desired range (decision step 1030). If not, the index manager 220 returns to step 1015 and reads another row from the table. Otherwise, the index manager 220 inserts the copied key in the leaf page being rebuilt (step 1035).

The index manager 220 determines whether the insert was successful (decision step 1040). If yes, the index manager 220 returns to step 1015. If the insert is not successful (decision step 1040), the index manager 220 allocates and formats a new leaf page (step 1045). The index manager 220 links the new leaf page to the previously formatted leaf page (step 1050) and returns to step 1035 to insert the key in the new leaf page.

FIG. 11 illustrates a method 1100 of the index manager 220 in attaching a rebuilt leaf page to a non-leaf page. FIG. 11 corresponds to FIG. 9. That is if leaf pages are rebuilt using the method 900, method 1100 of FIG. 11 will be used to attach the rebuilt leaf pages to the index. Similarly, FIG. 12 corresponds to FIG. 10. That is if leaf pages are rebuilt using the method 1000 of FIG. 10, method 1200 of FIG. 12 will be used to attach the rebuilt leaf pages to the index.

The index manager 220 selects a key from the index page that was rebuilt (step 1105). This is the page that was placed in rebuild pending and that needs to be removed from the index. The index manager 220 traverses down the index to the lowest non-leaf page that contains the selected key (step 1110). The index manager 220 removes and deallocates the old leaf page (step 1115). Method 1100 determines at decision step 1120, if there exists a rebuilt leaf page. If not, method 1100 exits at step 1125; otherwise, it proceeds to step 1135 and detaches the page from the rebuilt page chain.

The index manager 220 selects the highest key from the detached page (step 1140). The index manager 220 traverses the index to the lowest non-leaf page that contains the selected key (step 1145). The index manager 220 attaches a leaf page to the non-leaf page (step 1150). The index manager 220 decrements a number of pages in the rebuilt leaf chain by one (step 1155). The index manager 220 repeats steps 1120 through 1155 until of the leaf pages in the rebuilt leaf chain are processed.

FIG. 12 illustrates a method 1200 of attaching a new leaf page to a non-leaf page. This is the page that was placed in rebuild pending (referred to as page X). FIG. 12 relates to the direct rebuilding of page X. So page X has right keys, and what is needed is to ensure that it is attached at the right place in the index. This is different from FIG. 11 where page X is removed from the index altogether. The copied key (FIG. 10, step 1005) is used to traverse down to the non-leaf which points to page X. Then the highest key is considered on page X and placed in this non-leaf.

To attach new leaf pages, the index manager 220 removes the old non-leaf key that points to the leaf page that was initially placed in rebuild pending (referenced as the old leaf page). The index manager 220 uses the copied key (selected in step 1105, FIG. 11) to traverse to a lowest non-leaf page containing the copied key (step 1205). The index manager 220 determines whether the highest key on page X is bound on the non-leaf(decision step 1210). If yes (meaning page X is already attached to the right non-leaf), the index manager 220 replaces the key in the non-leaf key that corresponds to a pointer, pointing to leaf X with highest key from X (step 1215).

Considering a non-leaf index page that points to a leaf index pages. A non-leaf can point to other non-leaves. But the interest is in the lowest level of non-leaf index pages that point directly to leaf pages. A non-leaf contains pairs of key and page number, that is it contains pairs like (key_1, leaf pagenumber 1), (key_2, leafpagenumber 2) . . . (key_n, leafpagenumber n) and one extra leaf page number which is referred to as leafL. What these pairs mean is the following: The first pair (key_1, leaf pagenumber 1) identifies the keys less than key_1 that are in a leaf whose page number is given by pagenumber 1. Similarly, the pair (key_2, leaf page number 2) identifies all keys that lie between key_2 and key1 that are in leaf page pointed to by the leaf pagenumber 2.Similarly, the pair (key_n, leaf page number n) identifies all keys that lie between key_(n−1) and key_n that are in leaf page pointed to by the leaf pagenumber n. The page number leafL points to the last leaf that this non-leaf points to. It contains all keys larger than key_n.

As a result, when the last non-leaf page that is traversed points to page X, a pair (key_x, leaf pagenumber X) is determined to point to page X. In this case, what is needed is to ensure that the largest key on page X is actually key_x, or page X might be pointed at by leafL in which case what is needed is that the first key on page X is bigger than the one in the previous page and key_n is smaller than the first key on page X.

Otherwise, the index manager 220 detaches the leaf from the non-leaf page and traverses the index to the lowest non-leaf page using the highest key on the page. The index manager 220 attaches the leaf page to this non-leaf page (step 1220). The index manager 220 detaches the leaf from the rebuilt leaf chain (step 1225). The index manager 220 decrements the number of pages in the rebuild chain by one (step 1230).

The index manager 220 determines whether the number of pages on the rebuilt leaf chain is greater than zero (decision step 1235). If no, the index manager 220 exits processing (step 1240). If yes, the index manager 220 detaches the leaf page from the rebuilt leaf chain (step 1245). The index manager 220 uses the highest key on the detached leaf page to traverse the index to the lowest non-leaf page containing the highest key (step 1250). The index manager 220 attaches the detached leaf page to the non-leaf page (step 1255). The index manager 220 repeats steps 1230 through 1255 until the number of pages on the rebuilt leaf page is zero.

In the online version of the partial index rebuild after the leaf pages have been built by the relational scan, the index manager 220 scans the logs from the minimum LSN to the current end of the log and applies those changes. However, during the log apply phase, more updates may occur to the base table. The index manager 220 repeats the log apply phase, scanning the log from the end of the log in the previous log apply phase to the current end of the log. This process continues until the number of logs applied during a log apply phase is reduced below a predetermined minimum threshold or until the number of log apply phases exceed a certain maximum threshold. The index manager 220 quiesces updates to the base table, applies the remaining log records, and performs the leaf attachment phase.

FIG. 13 illustrates a method 1300 of performing a minimum LSN computation for an initial log apply phase. The index manager 220 copies a current end of a log record number to a variable end-of-log (EOL) and sets current minimum=0 (step 1305). In the beginning current minimum LSN is set to 0, so when the first page is seen, the current minimum is set to the LSN variable. Thereafter, if a page whose LSN is less than the current minimum is seen, the current minimum variable is updated. In this way the minimum LSN value is computed amongst all the pages in the table. This calculation is done during the index page rebuild phase.

At step 1310, method 1300 scans the next page from the table and the inquires at decision step 1315 if the end of the table has been reached. If it has, method 1300 proceeds to decision step 1320 where it inquires if the current minimum exceeds the EOL. If it does, method 1300 proceeds to step 1330 where it starts a log scan from the current minimum; otherwise, it proceeds to step 1325 it starts a log scan from the EOL.

If at decision step 1315 the end of table has not been reached, the index manager 220 determines if the current minimum is equal to zero (decision step 1335). If yes, the index manager 220 sets the current minimum equal to the page LSN (step 1340) and returns to step 1310. If not, the index manager 220 determines whether the current minimum is less than the page LSN (decision step 1345). If the current minimum is not less than the page LSN, the index manager 220 returns to step 1310. Otherwise the index manager 220 sets the current minimum equal to the page LSN (step 1340) and returns to step 1310.

During the page rebuild phase of the online version of index rebuild algorithm the relational scan scans N pages of the base table and computes the minimum LSN. When a page is S-latched, the index manager 220 notes the LSN of the page. The index manager 220 reads uncommitted rows; i.e., the index manager 220 does not require a lock to verify whether a row is committed. The index manager 220 releases the S-latch only after scanning the page. If the page does not contain a row that is of interest, the index manager 220 still uses the LSN of the page in the minimum LSN calculation. Otherwise, the index manager 220 may miss a log record. The index manager 220 selects a minimum of all the LSNs of the scanned pages. If this minimum is larger than the end of log LSN at the beginning of the relational scan, then the index manager 220 uses this computed minimum. Otherwise, the index manager 220 uses the end of the log LSN.

It is to be understood that the specific embodiments of the invention that have been described are merely illustrative of certain applications of the principle of the present invention. Numerous modifications may be made to the system and method for increasing availability of an index described herein without departing from the spirit and scope of the present invention. Moreover, while the present invention is described for illustration purpose only in relation to a database management system, it should be clear that the invention is applicable as well to, for example, a relational database system. Furthermore, while the invention is described for illustration purpose only in relation to an index associated with a database management system, it should be clear that the invention is applicable as well to, for example, any index.

What is claimed is:

1. A processor-implemented method for increasing availability of an index, comprising:
   detecting that an error occurred in the index;
   upon detecting the error in the index, selectively placing individual pages of the index in a restricted state, while maintaining traversability to remaining pages of the index that are in an unrestricted state, thereby increasing the availability of the index; and
   retaining uncommitted data in the index, wherein the uncommitted data is associated with the individual pages placed in the restricted state;
   preventing access to the uncommitted data in the index; and
   implementing a recovery procedure for the individual pages placed in the restrictive state, wherein the recovery procedure processes the uncommitted data, so that the index is fully accessible.

2. The method of claim 1, wherein the error includes a physical error.

3. The method of claim 1, wherein the error includes a logical error.

4. The method of claim 1, wherein maintaining the traversability to the remaining pages includes placing all changes resulting from a structural modification operation in the index.

5. The method of claim 1, wherein if during an undo operation, as the index is being traversed, a non-leaf page of the index that is placed in the restrictive state, is reached, creating a left sentinel and a right sentinel for the non-leaf page.

6. The method of claim 1, wherein if the error includes a physical error, implementing the recovery procedure includes implementing a log reapply process, so that the entire index is fully accessible.

7. The method of claim 1, wherein if the error includes a logical error, placing leaf index pages of the index in a rebuild pending state and implementing a partial rebuild procedure, so that the entire index is fully accessible.

8. The method of claim 6, wherein if the error further includes a logical error, placing leaf index pages of the index in a rebuild pending state and implementing a partial rebuild procedure, so that the entire index is fully accessible.

9. A computer program product comprising a computer useable storage device storing a plurality of instruction codes that, when read and executed by a computer, causes the computer to perform a method for increasing availability of an index, comprising:
   detecting that an error occurred in the index;
   upon detecting the error in the index, selectively placing individual pages of the index in a restricted state, while maintaining traversability to remaining pages of the index that are in an unrestricted state, thereby increasing the availability of the index; and
   retaining uncommitted data in the index, wherein the uncommitted data is associated with the individual pages placed in the restricted state;
   preventing access to the uncommitted data in the index; and
   implementing a recovery procedure for the individual pages placed in the restrictive state, wherein the recovery procedure processes the uncommitted data, so that the index is fully accessible.

10. The computer program product of claim 9, wherein the error includes a physical error.

11. The computer program product of claim 9, wherein the error includes a logical error.

12. The computer program product of claim 9, wherein the program code for maintaining the traversability to the remaining pages places all changes resulting from a structural modification operation in the index.

13. The computer program product of claim 9, wherein if during an undo operation, as the index is being traversed, a non-leaf page of the index that is placed in the restrictive state is reached, a program code creates a left sentinel and a right sentinel for the non-leaf page.

14. The computer program product of claim 9, wherein if the error includes a physical error, a program code implements the recovery procedure by implementing a log reapply process, so that the entire index is fully accessible.

15. The computer program product of claim 9, wherein if the error includes a logical error, a program code places leaf index pages of the index in a rebuild pending state and implements a partial rebuild procedure, so that the entire index is fully accessible.

16. The computer program product of claim 14, wherein if the error further includes a logical error, a program code places leaf index pages of the index in a rebuild pending state and implements a partial rebuild procedure, so that the entire index is fully accessible.

17. A processor-implemented system for increasing availability of an index, comprising:
   a buffer manager, performed by a processor, for detecting that an error occurred in the index;
   a page restriction module, performed by a processor, for, upon detecting the error in the index, selectively placing individual pages of the index in a restricted state, while maintaining traversability to remaining pages of the index that are in an unrestricted state, thereby increasing the availability of the index;
   the page restriction module further retaining uncommitted data in the index, wherein the uncommitted data is associated with the individual pages placed in the restricted state;
   a sentinel module, performed by a processor, for preventing access to the uncommitted data in the index; and
   a recovery utility for implementing a recovery procedure for the individual pages placed in the restrictive state, wherein the recovery procedure processes the uncommitted data, so that the index is fully accessible.

18. The system of claim 17, wherein the error includes a physical error.

19. The system of claim 17, wherein the error includes a logical error.

* * * * *